(12) United States Patent
Fujii et al.

(10) Patent No.: US 6,249,489 B1
(45) Date of Patent: Jun. 19, 2001

(54) INFORMATION RECORDING-REPRODUCING METHOD UTILIZING DOMAIN WALL DISPLACEMENT, AND MAGNETO OPTICAL MEDIUM

(75) Inventors: Eiichi Fujii, Kamakura; Masakuni Yamamoto, Yamato; Tsutomu Shiratori, Tokyo; Yasuyuki Miyaoka, Yokohama, all of (JP)

(73) Assignee: Canon Kabushiki Kaisha

( * ) Notice: Subject to any disclaimer, the term of this patent is extended or adjusted under 35 U.S.C. 154(b) by 0 days.

(21) Appl. No.: 09/141,350

(22) Filed: Aug. 27, 1998

(30) Foreign Application Priority Data

Aug. 29, 1997 (JP) .................................................. 9-233949
Aug. 20, 1998 (JP) ................................................ 10-234246

(51) Int. Cl.⁷ .......................................................... G11B 11/00
(52) U.S. Cl. ........................................ 369/13; 369/275.4
(58) Field of Search ................................. 369/13, 275.1, 369/275.3, 275.4

(56) References Cited

U.S. PATENT DOCUMENTS

| | | | |
|---|---|---|---|
| 4,912,694 | 3/1990 | Yamamoto | 369/59 |
| 4,923,766 | 5/1990 | Hosoi et al. | 428/694 |
| 4,937,799 | 6/1990 | Hashimoto et al. | 369/13 |
| 5,091,897 | 2/1992 | Otokawa et al. | 369/13 |
| 5,132,945 | 7/1992 | Osato et al. | 369/13 |
| 5,199,023 | 3/1993 | Yamamoto et al. | 369/275.4 |
| 5,233,578 | 8/1993 | Yamamoto et al. | 369/13 |
| 5,241,524 * | 8/1993 | Lee | 369/50 |
| 5,329,517 | 7/1994 | Yamaguchi et al. | 369/110 |
| 5,353,266 | 10/1994 | Fujii | 369/13 |
| 5,398,227 | 3/1995 | Miyaoka et al. | 369/116 |
| 5,418,076 | 5/1995 | Shiratori | 428/694 EC |
| 5,428,586 | 6/1995 | Kobayashi et al. | 369/13 |
| 5,517,471 | 5/1996 | Ashinuma et al. | 369/13 |
| 5,539,718 | 7/1996 | Hoshi et al. | 369/100 |
| 5,555,231 | 9/1996 | Yamamoto | 369/100 |
| 5,577,017 | 11/1996 | Yamamoto et al. | 369/110 |
| 5,581,532 | 12/1996 | Matsumura et al. | 369/110 |
| 5,616,428 | 4/1997 | Nishimura et al. | 428/694 ML |
| 5,629,909 | 5/1997 | Shiratori | 369/13 |
| 5,636,187 | 6/1997 | Fujii | 369/13 |
| 5,648,134 | 7/1997 | Shiratori et al. | 428/641 |
| 5,656,384 | 8/1997 | Nishimura et al. | 428/694 ML |
| 5,668,872 | 9/1997 | Morishima et al. | 380/4 |
| 5,699,342 * | 12/1997 | Yagi et al. | 369/13 X |
| 5,712,840 | 1/1998 | Matsumura et al. | 369/112 |
| 5,717,678 * | 2/1998 | Akiyama | 369/118 OR |
| 5,768,219 | 6/1998 | Yamamoto et al. | 369/13 |

(List continued on next page.)

FOREIGN PATENT DOCUMENTS

| | | |
|---|---|---|
| 673026 A2 | 9/1995 | (EP) . |
| 686970 A2 | 12/1995 | (EP) . |
| 785545 A2 | 7/1997 | (EP) . |
| 6-290496 | 10/1994 | (JP) . |

*Primary Examiner*—Aristotelis M. Psitos
(74) *Attorney, Agent, or Firm*—Fitzpatrick, Cella, Harper & Scinto

(57) ABSTRACT

Disclosed herein is an information recording-reproducing method, wherein a domain wall is displaced on a recording medium in which information has been recorded, thereby conducting the reproduction of the information, the method comprising, projecting a light spot on the recording medium, relatively moving the light spot and the recording medium, applying a magnetic field modulated according to the information to the site projected by the light spot to form record marks the maximum mark length of which is at most 0.15 times the spot size of the light spot and displacing the domain wall from the front to the back of the moving direction of the light spot by a temperature distribution formed on the recording medium by the light spot, and at the same time detecting the displacement of the domain wall from reflected light of the light spot, thereby detecting the record marks.

11 Claims, 15 Drawing Sheets

U.S. PATENT DOCUMENTS

| | | |
|---|---|---|
| 5,777,974 | 7/1998 | Yamamoto .......................... 369/112 |
| 5,786,117 | 7/1998 | Hoshi et al. .......................... 430/21 |
| 5,796,683 * | 8/1998 | Sumi et al. ...................... 369/130 R |
| 5,810,979 | 9/1998 | Nishimura et al. ............... 204/192.2 |
| 5,818,811 | 10/1998 | Fujii ................................. 369/275.4 |
| 5,835,469 * | 11/1998 | Maeda et al. ...................... 369/13 X |
| 5,841,755 | 11/1998 | Yamamoto et al. ................. 369/118 |
| 5,955,191 * | 9/1999 | Hirokane et al. .................. 369/13 X |
| 5,956,296 | 9/1999 | Yamamoto et al. .................... 369/13 |
| 5,959,942 * | 9/1999 | Taguchi et al. ......................... 369/13 |
| 5,989,705 * | 11/1999 | Nakajima et al. ................. 369/13 X |
| 5,995,472 * | 11/1999 | Fuji et al. ...................... 369/110 OR |
| 6,014,360 * | 1/2000 | Yonekubo et al. ........... 369/112 OR |
| 6,025,866 * | 2/2000 | Tsuchiya et al. .................... 347/256 |
| 6,027,825 | 2/2000 | Shiratori et al. ............. 428/694 ML |
| 6,049,518 * | 4/2000 | Tsuchiya et al. ............. 369/110 OR |

* cited by examiner

INFORMATION RECORDING-REPRODUCING METHOD UTILIZING DOMAIN WALL DISPLACEMENT, AND MAGNETO OPTICAL MEDIUM

BACKGROUND OF THE INVENTION

1. Field of the Invention

The present invention relates to an information recording-reproducing method comprising recording and reproducing information on and from a recording medium, and particularly to an information reproducing method utilizing domain wall displacement. The present invention also relates to a magneto-optical medium used in this method.

2. Related Background Art

In recent years, great expectation has been entertained of magneto-optical recording-reproducing apparatus using a magneto-optical disk as a recording medium in that they are portable, have a great memory capacity and are erasable and rewritable. FIG. 1 illustrates an optical head for such a magneto-optical recording-reproducing apparatus. In FIG. 1, reference numeral 15 designates a semiconductor laser as a light source. A divergent flux of rays emitted from the semiconductor laser 15 is made parallel by a collimator lens 16 and then rectified to a parallel flux of rays of a circular form in section by a beam-shaping prism. In this case, linearly polarized light components perpendicular to each other are regarded as P polarized light and S polarized light, and this parallel flux of rays is regarded as linearly polarized light of P polarized light (here, linearly polarized light in a direction parallel to the drawing).

The light flux of P polarized light is incident on a polarized light beam splitter 18. The polarized light beam splitter 18 is characterized by, for example, a transmittance of 60% and a reflectance of 40% for the P polarized light, and a transmittance of 0% and a reflectance of 100% for the S polarized light. The light flux of the P polarized light passed through the polarized light beam splitter 18 is focused by an objective lens 19 and is projected as a light spot on a magnetic layer of a magneto-optical disk 20. An external magnetic field is applied from a magnetic head 21 to this light-spot projected portion, so that a magnetic domain (mark) is recorded on the magnetic layer by the irradiation of the light spot and the application of the external magnetic field.

Reflected light from the magneto-optical disk 20 is returned to the polarized light beam splitter 18 through the objective lens 19. A part of the reflected light is separated here and afforded to a reproducing optical system. In the reproducing optical system, the light flux separated is further separated by a polarized light beam splitter 22 separately provided. The polarized light beam splitter 22 is characterized by, for example, a transmittance of 20% and a reflectance of 80% for the P polarized light, and a transmittance of 0% and a reflectance of 100% for the S polarized light. One light flux separated by the polarized light beam splitter 22 is guided to a half prism 29 through a condenser lens 28. The light flux is divided into two portions here, and one is guided to a photosensor 30, and the other to a photosensor 32 through a knife edge 31. Error signals for auto-tracking and auto-focusing of a light spot are generated by these controlling optical systems.

The other light flux separated by the polarized light beam splitter 22 is guided to a half-wave plate 23 for turning the polarizing direction of the light flux by 45 degrees, a condenser lens 24 for focusing the light flux, a polarized light beam splitter 25, and photosensors 26 and 27 for separately detecting light flux portions separated by the polarized light beam splitter 25 to reproduce information. The polarized light beam splitter 25 is characterized by a transmittance of 100% and a reflectance of 0% for the P polarized light, and a transmittance of 0% and a reflectance of 100% for the S polarized light. Signals detected by the photosensors 26 and 27 are differentially detected by a differential amplifier (not illustrated), thereby generating a reproduction signal.

In a magneto-optical medium, information is recorded by a difference in the direction of vertical magnetization. When the magneto-optical medium, in which information has been recorded by the difference in the direction of magnetization, is irradiated with linearly polarized light, the polarizing direction of light reflected therefrom is turned either clockwise or counterclockwise according to the difference in the direction of magnetization. For example, when a polarizing direction of linearly polarized light incident on the magneto-optical medium, and directions of reflected light for downward magnetization and reflected light for upward magnetization are regarded as directions of a coordinate axis P, R+ turned by +θk and R− turned by −θk, respectively, as illustrated in FIG. 2, and an analyzer is arranged in such a direction as illustrated in FIG. 2, light passed through the analyzer becomes A for R+ or B for −R. When this light is detected by a photosensor, information can be obtained as a difference in intensity of light. In the example illustrated in FIG. 1, the polarized light beam splitter 25 plays a part of the analyzer and serves as an analyzer in a direction turned by +45 degrees from the axis P for one light flux separated or in a direction turned by −45 degrees from the axis P for the other light flux. Namely, the signal components obtained by the photosensors 26 and 27 become antiphase. Therefore, the individual signals are differentially detected, whereby a reproduction signal can be obtained with reduced noise. In FIG. 2, axis S means an axis for S polarized light direction. Points S+ and S− on axis S mean S coordinates of points R+ and R− when letting the coordinates of points R+ and R− be (P+, S+) and (P+, S−) in P-S coordination system, respectively.

Recently, there has been a strong demand for enhancing the recording density of this magneto-optical medium. In general, the recording density of an optical disk such as a magneto-optical medium depends on the laser wavelength and the NA (numerical aperture) of an objective lens of a reproducing optical system. More specifically, since the laser wavelength λ and the NA of the objective lens of the reproducing optical system decide the diameter of a light spot, the range of a reproducible magnetic domain is limited to about λ/2NA. Therefore, for actually achieving higher recording density with a conventional optical disk, it has been necessary to shorten the laser wavelength or enlarge the NA of the objective lens in the reproducing optical system. However, the improvements in the laser wavelength and the NA of the objective lens are limited naturally. Therefore, techniques that the construction and reading method of a recording medium are devises to improve the recording density have been developed.

For example, in Japanese Patent Application Laid-Open No. 6-290496, there is proposed a domain wall displacement-reproduction system in which a reproduction signal is obtained after a light spot is scanned on a track on a magneto-optical medium composed of a laminate of plural magnetic layers, thereby transferring a magnetic domain (mark) recorded as vertical magnetization on a first magnetic layer to a third magnetic layer arranged with interposition of a second magnetic layer for adjusting exchange-coupling force, and a domain wall of the magnetic domain transferred to the third magnetic layer is displaced, thereby making the magnetic domain larger than the magnetic domain (mark) recorded on the first magnetic layer.

FIGS. 3A to 3D illustrate the principle of the domain wall displacement-reproduction method. FIG. 3A is a cross-sectional view of magnetic layers of a magneto-optical medium, and FIG. 3B is a plan view viewed from the side on which a light spot is incident. In FIG. 3A, an arrow A indicates a moving direction of the medium. Reference numeral 33 designates a magneto-optical disk as the magneto-optical medium. Reference numeral 34 indicates a first magnetic layer which is a memory layer for recording information as a magnetic domain (mark). Reference numeral 35 indicates a second magnetic layer which is an switching layer for adjusting exchange-coupling force between the memory layer 34 and a third magnetic layer 36. The third magnetic layer 36 is a displacement layer to which the magnetic domain recorded on the memory layer 34 is transferred, and which makes the transferred magnetic domain larger than the magnetic domain recorded on the memory layer 34 by displacing a domain wall of the transferred magnetic domain using the function of the switching layer 35 and the heat distribution by the light spot. In FIG. 3A, an arrow B indicates a moving direction of the domain wall.

These magnetic layers are exchange-coupled to one another at room temperature. At a temperature close to ambient temperature, the first magnetic layer 34 is relatively smaller in domain wall coercive force and greater in domain wall displaceability compared with the third magnetic layer 36. The second magnetic layer 35 is composed of a magnetic film having a Curie temperature lower than the first and third magnetic layers. Reference numeral 37 indicates a light spot for reproduction, and 38 a track intended to reproduce on the magneto-optical disk 33. Arrows in the respective layers of the memory layer 34, the switching layer 35 and the displacement layer 36 indicate directions of atomic spins. Such a domain wall as indicated by 39 is formed between regions in which the directions of spins are opposite to each other. Reference numeral 40 indicates a domain wall, which is being displaced, within the magnetic domain transferred to the displacement layer 36.

FIG. 3C diagrammatically illustrates a temperature distribution formed on the magneto-optical disk 33, in which an axis of ordinate and an axis of abscissa indicate a medium temperature T and a position X, respectively. Domain wall displacement-reproduction may be theoretically feasible by using either one light spot or two light spots. For the sake of brevity of description, reproduction using two light spots will be described here. Only a light spot contributing to a reproduction signal is illustrated in FIG. 3B. The second light spot (not illustrated) is projected for forming the temperature distribution illustrated in FIG. 3C. Now, suppose that the temperature on the magneto-optical disk 33 at a position Xs is a temperature Ts close to the Curie temperature of the switching layer 35, a hatching portion 41 in FIG. 3A indicates a region in which the temperature is above the Curie temperature.

FIG. 3D diagrammatically illustrates the distribution of domain wall energy density σ1 of the displacement layer 36 corresponding to the temperature distribution in FIG. 3C, in which a left axis of ordinate and a right axis of ordinate indicate domain wall energy density σ and force F acting on the domain wall, respectively. When a gradient of the domain wall energy density σ exists in a direction of X as illustrated in FIG. 3D, the force F1 illustrated in FIG. 3D acts on the domain walls of the respective magnetic layers existing at the position X so as to displace the domain walls to a position at which the domain wall energy is lower. Since the displacement layer 36 is small in domain wall coercive force and great in domain wall displaceability, its domain wall is easily displaced in itself by this force F1. In a region on this side of Xs (right-hand side of the center in FIGS. 3A and 3B), however, the temperature of the magneto-optical disk 33 is yet lower than Ts, and so the domain wall in the displacement layer 36 also comes to be fixed at a position corresponding to the position of the domain wall of the memory layer 34 by the exchange-coupling with the memory layer 34 great in domain wall coercive force.

Now, when the domain wall 40 is at a position Xs as illustrated in FIG. 3A, and the temperature of the magneto-optical disk 33 at the position Xs is raised to Ts close to the Curie temperature of the switching layer 35, and so the exchange-coupling between the displacement layer 36 and the memory layer 34 is broken, the domain wall 40 in the displacement layer 36 is momentarily displaced to a region in which the temperature is higher and the domain wall energy density is lower, as shown by the arrow B. Accordingly, when the light spot 37 for reproduction passes through the region, the atomic spins of the displacement layer 36 within the light spot are all aligned in one direction as illustrated in FIG. 3B. With the movement of the medium, the domain wall 40 (or 39, or the like) is momentarily displaced, and the directions of atomic spins within the light spot are reversed to align in one direction.

With respect to the reflected light from the magneto-optical disk 33, a reproduction signal is detected by the same differential detection as in the conventional optical head illustrated in FIG. 1. However, the signal reproduced by the light spot always become a fixed amplitude irrespective of the size of magnetic domains recorded on the memory layer 34, which eliminates the problem of waveform interference caused by optical diffraction limit. More specifically, the use of the domain wall displacement-reproduction permits reproduction of magnetic domains (marks) smaller than the resolving power limit determined by the laser wavelength λ and the NA of the objective lens, i.e., about λ/2NA, and reproduction at a submicron linear density.

FIG. 4 illustrates an example of the construction of an optical head in the case where 2 light spots are used. In FIG. 4, reference numeral 42 designates a semiconductor laser for record reproduction, the wavelength of which is 780 nm by way of example. Reference numeral 43 indicates a semiconductor laser for heating, the wavelength of which is 1.3 μm by way of example. Both lasers are arranged in such a manner that rays emitted therefrom are incident in the form of P polarized light on a recording medium. Laser beams emitted from the semiconductor lasers 42 and 43 are shaped in a substantially circular form by beam-shaping means (not illustrated) and then rectified to parallel fluxes of rays by respective collimator lenses 44 and 45. Reference numeral 46 designates a dichroic mirror designed to completely transmit light of 780 nm and completely reflect light of 1.3 μm. Reference numeral 47 indicates a polarized light beam splitter 18 designed to transmit 70 to 80% of P polarized light and almost completely reflect S polarized light which is a component perpendicular to the P polarized light.

The light fluxes made parallel by the collimator lenses 44 and 45 are incident on an objective lens 48 through the dichroic mirror 46 and the polarized light beam splitter 47. At this time, the light flux of 780 nm is made larger than the aperture size of the objective lens 48, while the light flux of 1.3 μm is made smaller than the aperture size of the objective lens 48. Accordingly, the NA of the lens acts smaller on the light flux of 1.3 μm though the same objective lens 48 is used, whereby the size of a light spot on a recording medium 49 becomes larger than that of the light flux of 780 nm. Reflected light from the recording medium passes through the objective lens 48 again into a parallel flux of rays. This light flux is reflected by the polarized light beam splitter 47 into a light flux 50. After the light flux 50 is subjected to wavelength separation and the like in another optical system (not illustrated), a servo error signal and an information-reproduction signal are obtained in the same manner as in the conventional system.

FIGS. 5A and 5B illustrate a relationship between a light spot for record reproduction and a light spot for heating on a recording medium. In FIG. 5A, reference numerals 51 and 52 indicate a light spot of wavelength of 780 nm for record reproduction and a light spot of wavelength of 1.3 μm for heating, respectively. Reference numeral 53 designates a domain wall of a magnetic domain recorded on a land 54, and 55 a groove. Reference numeral 56 indicates a region in which the temperature T has been raised by the light spot for heating. Such a temperature gradient as illustrated in FIG. 5B can be formed on a moving recording medium by combining the light spot 51 for record reproduction and the light spot 52 for heating on the land 54 between the grooves 55. A relationship between the temperature gradient and the light spot for record reproduction becomes the same as that illustrated in FIGS. 3B and 3C, whereby the domain wall displacement-reproduction can be conducted.

The above description is about the domain wall displacement-reproduction system using two beams. However, reproduction by one beam is desirable in view of the simplification of apparatus. Operation in the case where domain wall displacement-reproduction is conducted by one beam is described with reference to FIGS. 6A and 6B. FIG. 6A is a cross-sectional view of a magneto-optical disk 33 like FIG. 3A. The disk 33 is composed of a memory layer 34, an switching layer 35 and a displacement layer 36. FIG. 6B is a plan view viewed from the side on which a light spot is incident. Reference numerals 54 and 55 indicate a land of a track and a groove, respectively. Reference numeral 57 indicates a light spot for reproduction. When the light spot 57 is projected, a temperature distribution indicated by an oval contour as illustrated in FIG. 6B is formed on the recording medium. The moving direction of the medium is a direction of an arrow A. Arrows in the respective layers of the magneto-optical medium 33 indicate directions of atomic spins.

A region indicated by 60 is a high-temperature portion heated to a temperature above the Curie temperature of the switching layer 35, and so the magnetization of the switching layer 35 disappears. Therefore, the exchange-coupling between the memory layer 34 and the displacement layer 36 is broken in the region of the high-temperature portion 60, so that a magnetic domain of the memory layer 34 is not transferred to the displacement layer 36. In other regions than the high-temperature portion 60, the magnetic domain of the memory layer 34 is transferred to the displacement layer 36, since exchange-coupling power functions. When domain walls 58 and 59 of the magnetic domain recorded on the memory layer 34 come to respective boundaries between a low-temperature region and the high-temperature region 60, the domain walls 58 and 59 are displaced toward the high-temperature portion in directions of an arrow D and an arrow C, respectively. Reference numeral 61 indicates a region (hatching portion) in which the domain wall 58 is displaced (hereinafter referred to as "front region"), and reference numeral 62 designates a region (hatching portion) in which the domain wall 59 is displaced (hereinafter referred to as "back region"). As apparent from FIGS. 6A and 6B, it is understood that when it is intended to reproduce information by the conventional differential detection as it is, information by the domain wall 58 and information by the domain wall 59 are mixed into the light spot 57, and so the information cannot be correctly reproduced.

The problem offered in the case of one-beam reproduction is described in more detail with reference to FIGS. 7A to 7G. FIGS. 7A to 7F illustrate a state that a light spot 57 for reproduction successively scans a land 54 on a track. A recording medium is moving in a direction of an arrow A like FIG. 6A. Reference numerals 61 and 62 indicate a front region and a back region, respectively. Suppose that an isolated magnetic domain 63 is recorded on the land 54, and for example, the isolated magnetic domain 63 alone is magnetized upward, while the other is magnetized downward. Reference numerals 64 and 65 indicate domain walls on both sides of the isolated magnetic domain 63. FIG. 7G illustrates reproduced waveforms of differential signals obtained at respective positions. First of all, FIG. 7A illustrates a state in a case where the light spot 57 is located at a position distant from the isolated magnetic domain 63.

In this case, both front region 61 and back region 62 are magnetized downward, and a differentially detected signal at this time indicates a ground level as illustrated in FIG. 7G. FIG. 7B illustrates a state in a case where the light spot 57 has come near to the isolated magnetic domain 63. In this case, however, the domain wall 64 does not yet reach the front region 61, and a differentially detected signal indicates a ground level like the case of FIG. 7A. FIG. 7C illustrates a state that the domain wall 64 has just entered the front region 61. In this case, the domain wall 64 of the displacement layer 36 in the front region 61 is displaced toward the high-temperature portion, and a hatching portion indicated by 66 in FIG. 7C becomes a region magnetized upward. A differentially detected signal is changed to a higher level as illustrated in FIG. 7G.

FIG. 7D illustrates a state that the domain wall 65 on the opposite side has just entered the front region 61. In this case, the domain wall 65 of the displacement layer 36 in the front region 61 is displaced toward the high-temperature portion and returned to downward magnetization. A differentially detected signal is also returned to the ground level as illustrated in FIG. 7G. FIG. 7E illustrates a state in a case where the light spot 57 is further advanced, and the domain wall 64 has just entered the back region 62. In this case, the domain wall 64 of the displacement layer 36 in the back region 62 is displaced toward the high-temperature portion, and a hatching portion indicated by 67 becomes a region magnetized upward. A differentially detected signal is changed to a medium level as illustrated in FIG. 7G. The reason why the signal level becomes lower than the case of the front region 61 is that the center of the high-temperature portion is situated on the back side of the center of the light spot 57. FIG. 7F illustrates a state that the domain wall 65 on the opposite side has just entered the back region 62. In this case, the domain wall 65 of the displacement layer 36 in the back region 62 is displaced toward the high-temperature portion and returned to downward magnetization. A differentially detected signal is also returned to the ground level.

As described above, the domain wall is displaced at two places of the front region and the back region for one isolated magnetic domain when the domain wall displacement-reproduction system using one beam is used, so that two pulses are obtained naturally. Since magnetic domains are optionally recorded for actual signals, the contribution of the domain wall displacement in the front and back regions to a differentially detected signal cannot be distinguished because of their complicated mixing. As a method for solving this problem, there is a method using a Curie temperature mask of the displacement layer 36 as illustrated in FIGS. 8A and 8B. FIG. 8A is a cross-sectional view of a magneto-optical disk 33 like FIG. 6A, and FIG. 8B is a plan view viewed from the side on which a light spot is incident. Reference numeral 68 indicates a light spot for reproduction. As with the case illustrated in FIG. 6B, a temperature distribution indicated by an oval contour is formed on the magneto-optical disk 33.

In this method, the power of the light spot 68 is preset higher than the case illustrated in FIGS. 6A and 6B. A hatching region indicated by 69 is a high-temperature portion heated to a temperature above the Curie temperature of the displacement layer 36, and so the magnetization of the displacement layer 36 in the region of the high-temperature portion 69 disappears, and the domain wall is also not displaced. Hatching regions indicated by 70 on both sides of the high-temperature portion 69 are medium-temperature portions heated to a temperature above the Curie temperature of the switching layer 35, but lower than the temperature of the high-temperature portion 69.

As described in FIGS. 6A and 6B, the exchange-coupling between the memory layer 34 and the displacement layer 36 is broken in the regions of the high-temperature portion 69 and the medium-temperature portion 70, and so the magnetic domain of the memory layer 34 is not transferred to the displacement layer 36. On the other hand, at low-temperature portions on the outsides of the medium-temperature portions 70, the magnetic domain of the memory layer 34 is transferred to the displacement layer 36, since exchange-coupling power functions. When domain walls 73 and 74 of the magnetic domain recorded on the memory layer 34 come to respective boundaries between the low-temperature region and the medium-temperature portion 70, the domain walls 73 and 74 are displaced toward the high-temperature portion in directions of an arrow B and an arrow C, respectively. Reference numeral 71 indicates a front region in which the domain wall 73 is displaced, and reference numeral 72 designates a back region in which the domain wall 74 is displaced. As apparent from FIG. 6B, it is understood that the back region 72 is beyond the light spot 68 due to the high-temperature portion 69 heated to a temperature exceeding the Curie temperature of the displacement layer 36. In such a manner, the reproduction signal of information by differential detection is prevented from being affected by the back region 72, so that the domain wall displacement-reproduction by one beam can be successfully conducted.

As described above, domain wall displacement-reproduction includes two methods of reproduction by one beam and reproduction by two beams. The reproduction method by two beams, in which another light spot for reproduction than a light spot for heating is projected on a medium, requires two reproducing optical systems, so that the constitution of the apparatus is complicated.

On the contrary, the reproduction method by one beam can simplifies the constitution of the apparatus. Since a domain wall displaced from the front side of the light spot for reproduction toward the high-temperature portion within the light spot for reproduction, and a domain wall displaced from the back side of the light spot for reproduction toward the high-temperature portion within the light spot for reproduction are detected at the same time, however, the information cannot be correctly reproduced. For solving this problem, a method using a Curie temperature mask as has been described by FIGS. 8A and 8B is considered. This method permits the domain wall displacement-reproduction by one beam because the signal from the back region can be inhibited. However, this method has involved a problem that a signal to noise ratio is lowered because the front region also becomes small.

SUMMARY OF THE INVENTION

In view of the above-described problems involved in the prior art, it is an object of the present invention to provide an information recording-reproducing method which permits domain wall displacement-reproduction by one beam without lowering a signal to noise ratio, and a magneto-optical medium used in such a method.

The above object can be achieved by the present invention described below.

According to the present invention, there is thus provided an information recording-reproducing method, wherein a domain wall is displaced on a recording medium in which information has been recorded, thereby conducting the reproduction of the information, the method comprising:

projecting a light spot on the recording medium;

moving relatively the light spot and the recording medium;

applying a magnetic field modulated according to the information to a site on which the light spot has been projected to form a record mark the maximum mark length of which is at most 0.15 times a spot size of the light spot; and displacing the domain wall from a front to a back of a moving direction of the light spot by a temperature distribution formed on the recording medium by the light spot, and at the same time detecting the displacement of the domain wall by reflected light of the light spot, thereby detecting the record mark.

According to the present invention, there is also provided a magneto-optical medium capable of reproducing information by displacing a domain wall relatively to a light spot, wherein the information is formed by a record mark the maximum mark length of which is at most 0.15 times a spot size of the light spot.

DESCRIPTION OF THE PREFERRED EMBODIMENTS

Figure 9:
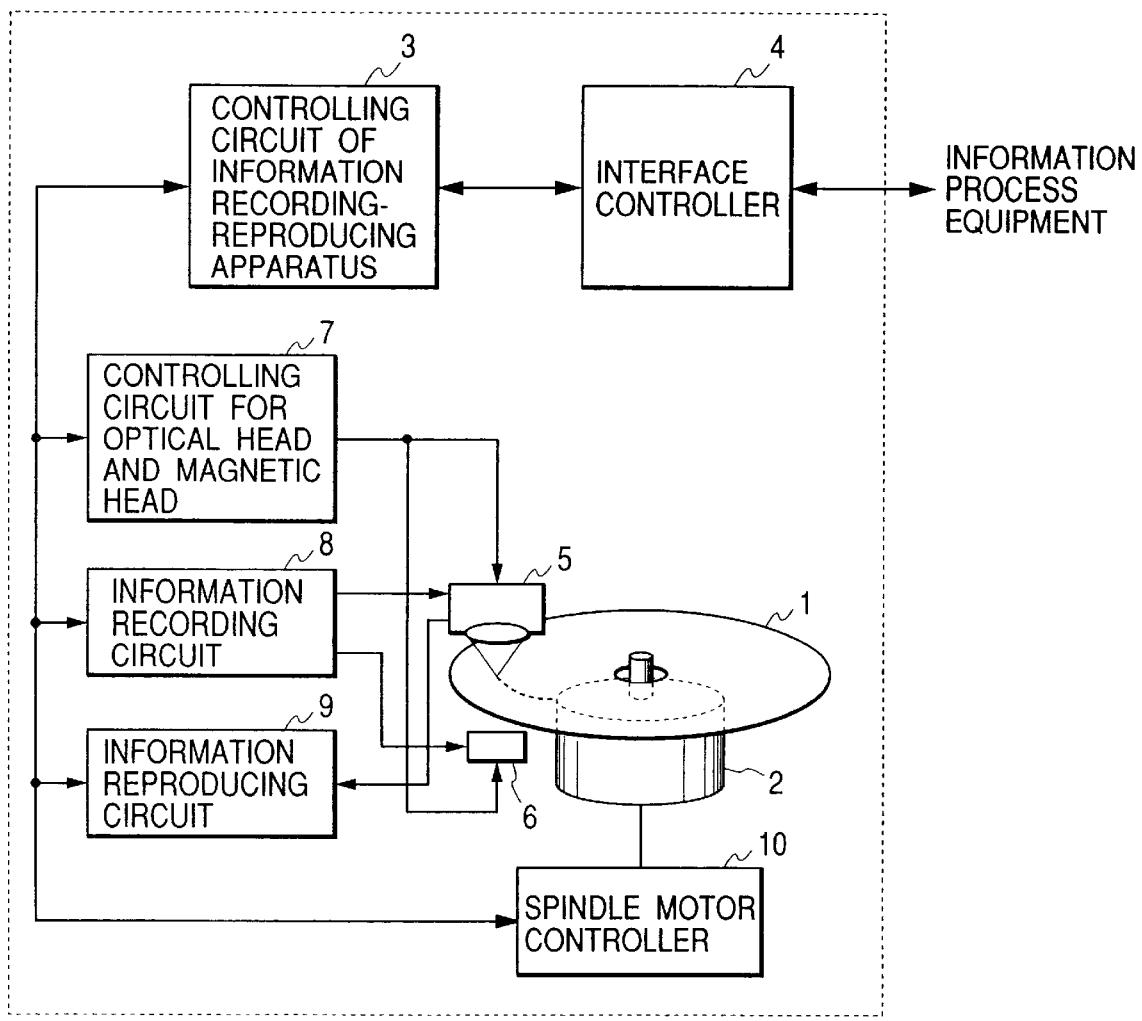
FIG. 9 illustrates the constitution of a magneto-optical recording-reproducing apparatus used in an information recording-reproducing method according to a first embodiment of the present invention.

The embodiments of the present invention will hereinafter be described in detail with reference to the accompanying drawings. FIG. 9 illustrates an example of the constitution of a magneto-optical recording-reproducing apparatus used in an information recording-reproducing method according to a first embodiment of the present invention. In FIG. 9, reference numeral 1 designates a magneto-optical disk as an information recording medium, which rotates on its axis at a predetermined rate according to drive of a spindle motor 2. The magneto-optical disk 1 is introduced into or discharged from the apparatus by a certain mechanism (not illustrated). Reference numeral 3 indicates a controlling circuit for controlling individual parts within the apparatus, which is connected to an external information process equipment such as a computer through an interface controller 4. The controlling circuit 3 controls the sending and receiving of information to and from the information process equipment and the recording-reproducing operation of the magneto-optical disk 1.

Figure 1:
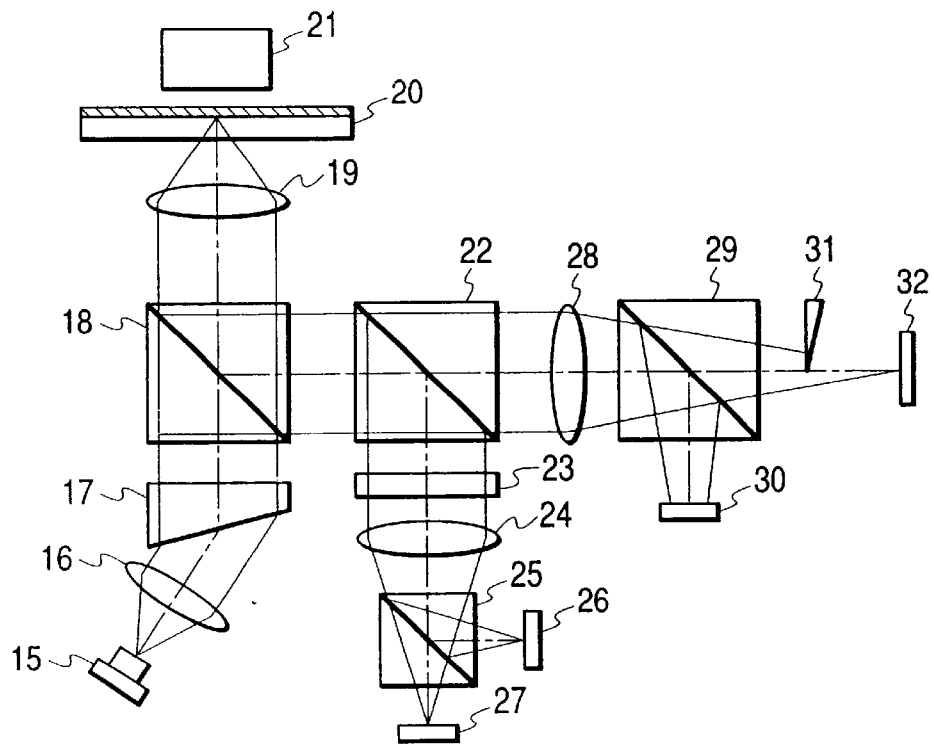
FIG. 1 illustrates an optical system used in a conventional magneto-optical recording-reproducing apparatus.
Figure 2:
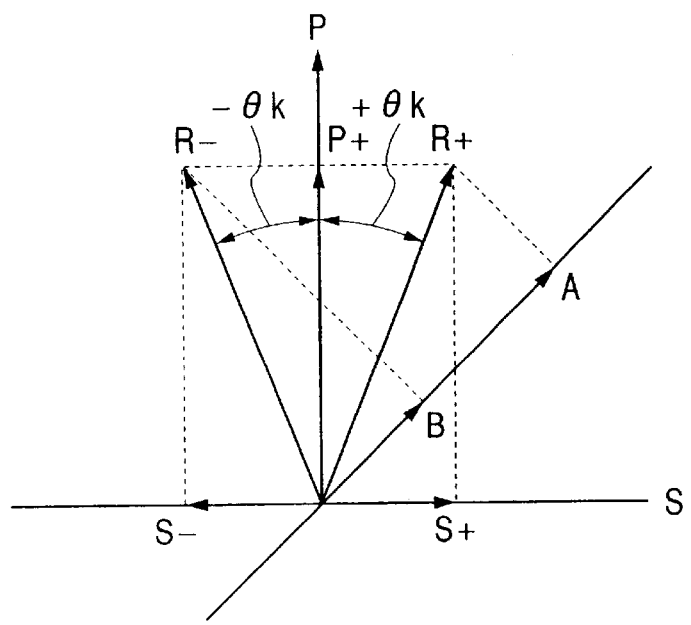
FIG. 2 illustrates the reproduction of a magneto-optical signal.
Figure 3A:
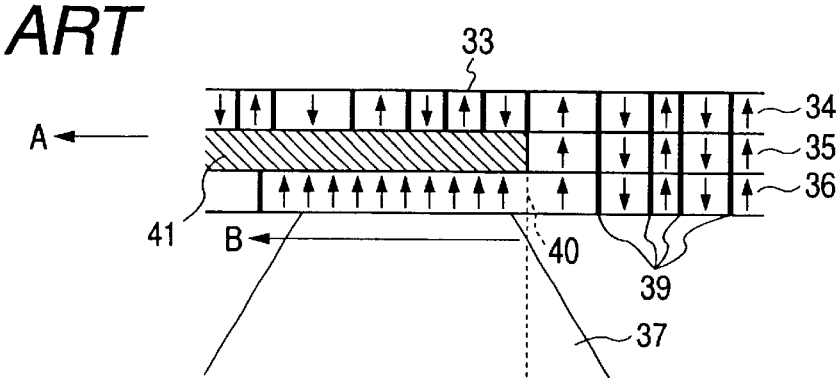
FIGS. 3A, 3B, 3C and 3D illustrate the principle of the conventional domain wall displacement-reproduction.
Figure 3B:
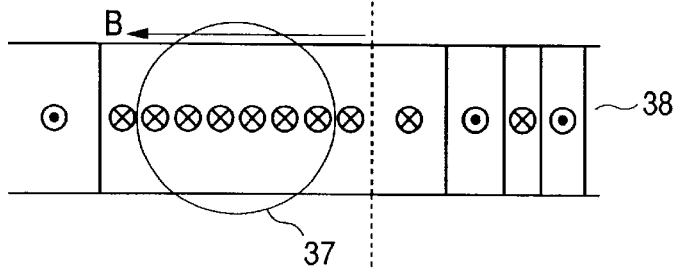
Figure 3C:
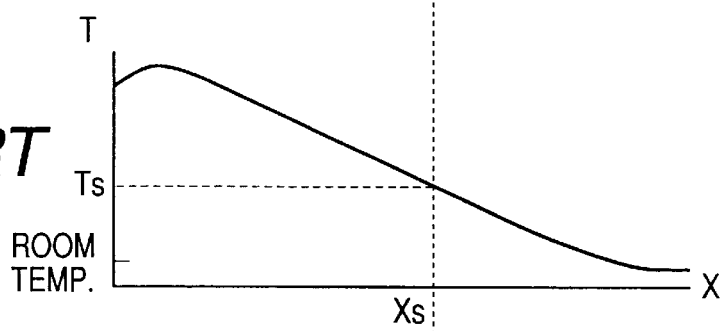
Figure 3D:
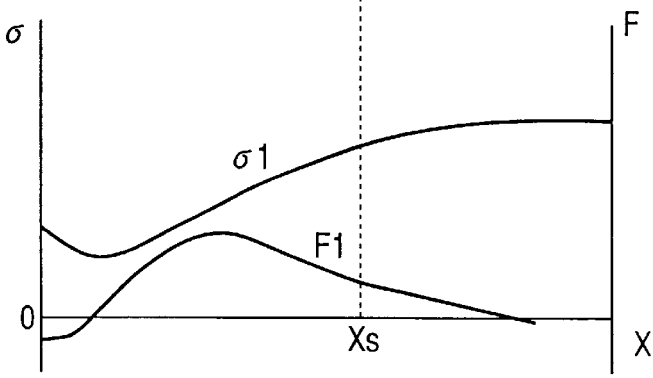
Figure 4:
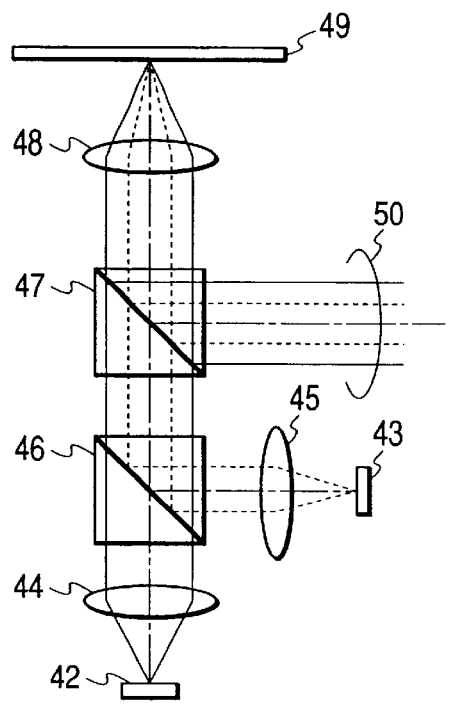
FIG. 4 illustrates an optical head in the case where domain wall displacement-reproduction is conducted by two beams.
Figure 5A:
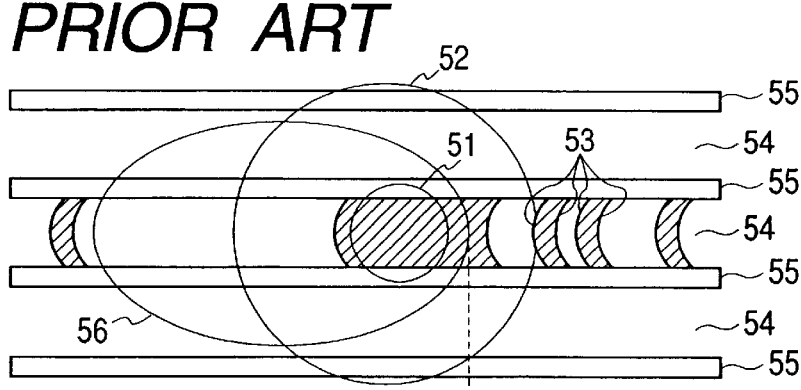
FIGS. 5A and 5B illustrate domain wall displacement-reproduction by two beams.
Figure 5B:
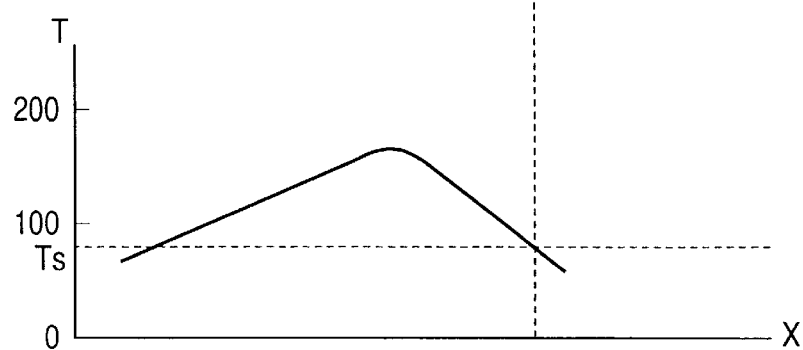

An optical head 5 is a recording-reproducing head for recording and reproducing information by irradiating the magneto-optical disk 1 with a light beam. Such an optical head for one beam as illustrated in FIG. 1 is used as the optical head 5. The optical head 5 is comprised of a semiconductor laser, an objective lens for focusing the laser beam, a photosensor for detecting reflected light from the disk 1, and the like. A magnetic head 6 is provided in opposition to the optical head 5 with interposition of the magneto-optical disk 1, and serves to apply a magnetic field to the magneto-optical disk 1 upon recording of information. A controlling circuit 7 for optical head and magnetic head is a controlling circuit for controlling the position of the light beam emitted on the magneto-optical disk 1 from the optical head 5 and the position of the magnetic head 6.

More specifically, the controlling circuit 7 for optical head and magnetic head serves to conduct seek control of the optical head 5 and the magnetic head 6, focusing control for focusing the light beam from the optical head 5 on the medium surface of the rotating magneto-optical disk 1, and tracking control for causing the light beam from the optical head 5 to follow an information track. A spindle motor controller 10 is a controlling circuit for controlling the rotation of the magneto-optical disk 1 on the basis of the control by the controlling circuit 3.

An information recording circuit 8 is a circuit for recording information in the magneto-optical disk 1 according to the control by the controlling circuit 3, and an information reproducing circuit 9 is a circuit for reproducing the information recorded on the magneto-optical disk 1 on the basis of a read signal from the optical head 5. Now, when a recording command is issued from the information process equipment, the controlling circuit 3 controls the individual parts to move the optical head 5 and the magnetic head 6 to an intended track and transfers an information signal sent from the information process equipment to the information recording circuit 8. In the information recording circuit 8, the information signal is modulated, and the magnetic head 6 is driven according to the modulated signal. In addition, a fixed driving current for recording is supplied to the semiconductor laser within the optical head 5, thereby recording the information on the information track.

On the other hand, when a reproducing command is issued from the information process equipment, the controlling circuit 3 controls the individual parts to move the optical heat 5 to an intended track. In addition, the controlling circuit 3 controls the information recording circuit 8 to supply a fixed driving current for reproduction to the semiconductor laser within the optical head 5 and to scan a light beam for reproduction from the optical head 5 on the information track of the magneto-optical disk 1. At this time, reflected light from the magneto-optical disk 1 is detected by the optical head 5. In the information reproducing circuit 5, predetermined signal processing is conducted on the basis of this read signal to reproduce the recorded information. The reproduced data is transferred to the external information process equipment through the interface controller 4 under control of the controlling circuit 3.

A disk illustrated in FIGS. 3A to 3D is used as the magneto-optical disk 1 in this apparatus. More specifically, the magneto-optical disk 1 is composed of a memory layer 34 for recording information as a magnetic domain by a modulated magnetic field, an switching layer 35 for adjusting exchange-coupling between the memory layer 34 and a displacement layer 36, and the displacement layer 36 to which the magnetic domain recorded on the memory layer 34 is transferred, and which makes the transferred magnetic domain larger than the magnetic domain recorded on the memory layer 34 by displacing a domain wall of the transferred magnetic domain using the function of the switching layer 35 and the heat distribution by the light spot.

As specific materials for the individual layers of a group of the magnetic layers, there may be used amorphous alloys comprising each at least one of transition metals and rare earth metals in combination. For example, transition metals principally include Fe, Co and Ni, and rare earth metals principally include Gd, Tb, Dy, Ho, Nd and Sm. Typical combinations thereof include TbFeCo, GdTbFe, GdFeCo, GdTbFeCo and GdDyFeCo. In order to improve corrosion resistance and control domain wall coercive force, Cr, Mn, Cu, Ti, Al, Si, Pt, In and/or the like may be added in a small amount. In addition, a metal layer formed of Al, AlTa, AlTi, AlCr, Cu or the like may be added into such a layer structure to control thermal properties.

Figure 6A:
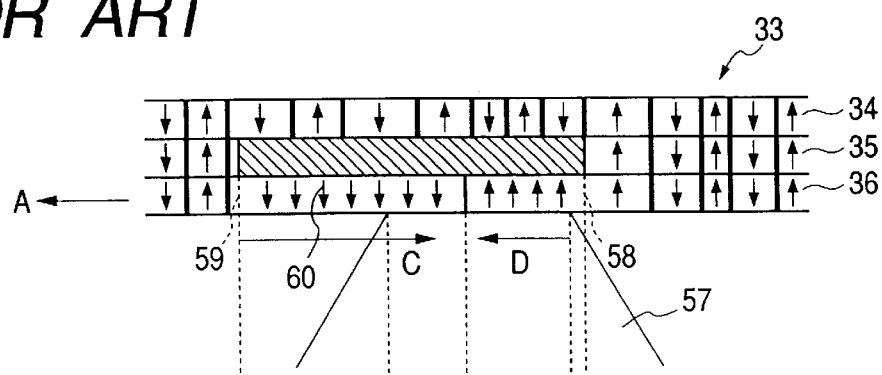
FIGS. 6A and 6B illustrate domain wall displacement-reproduction by one beam.
Figure 6B:
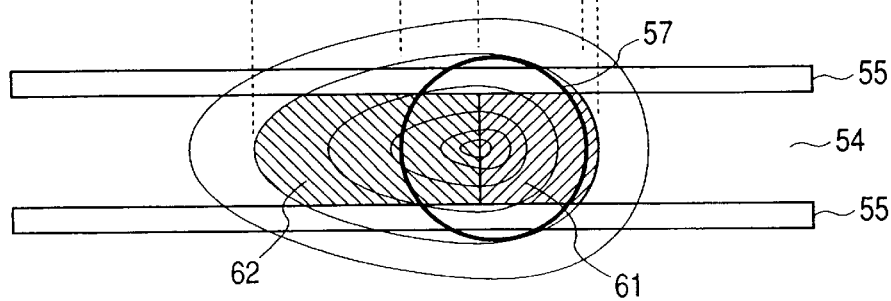
Figure 7A:
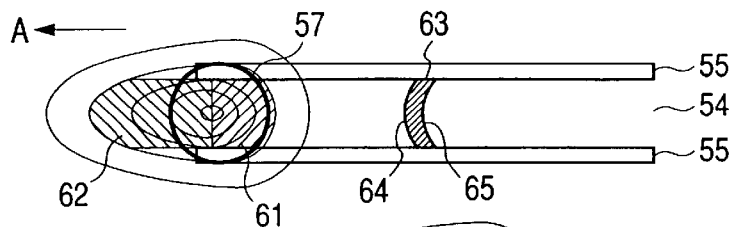
FIGS. 7A, 7B, 7C, 7D, 7E, 7F and 7G illustrate the problems involved in the domain wall displacement-reproduction by one beam.
Figure 7B:
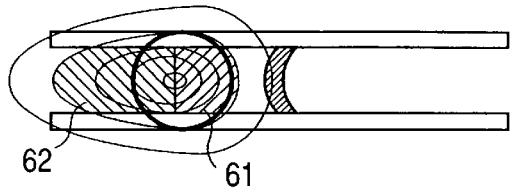
Figure 7C:
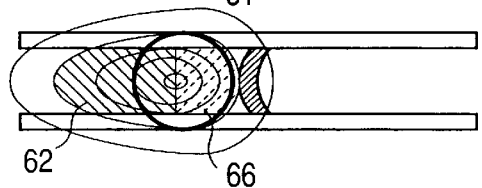
Figure 7D:
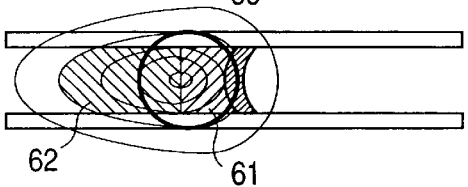
Figure 7E:
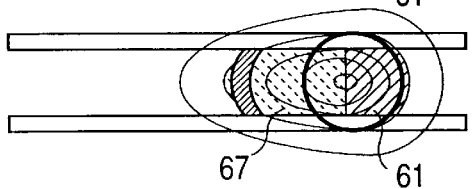
Figure 7F:
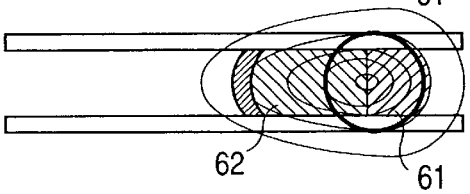
Figure 7G:
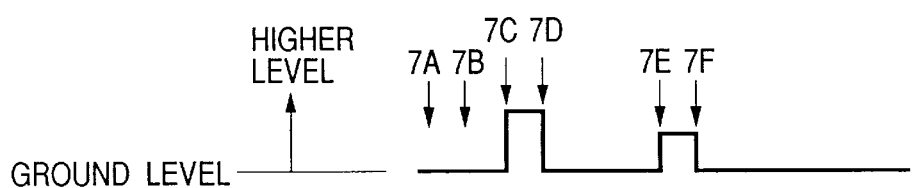
Figure 8A:
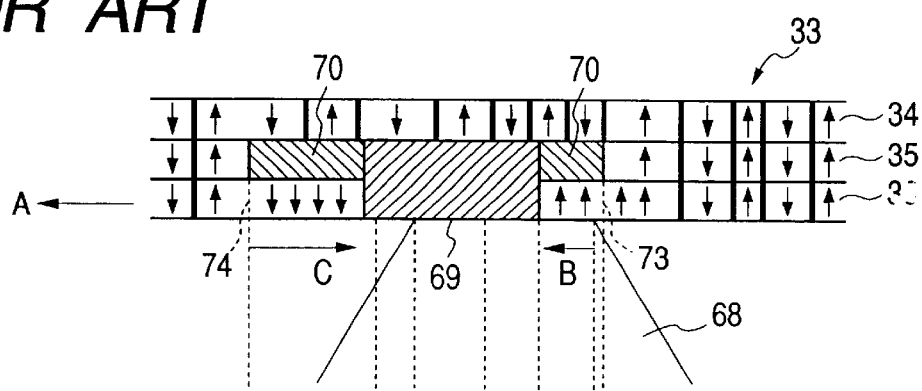
FIGS. 8A and 8B illustrate domain wall displacement-reproduction using a Curie temperature mask.
Figure 8B:
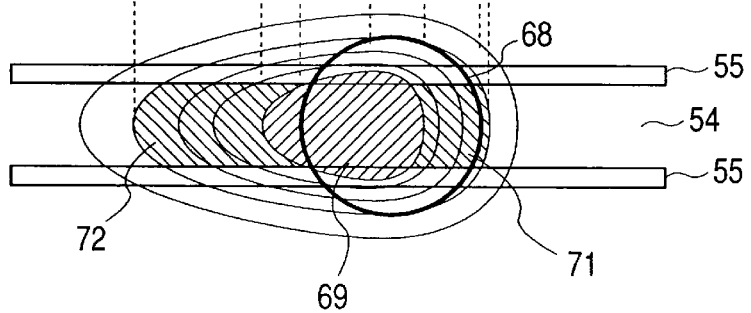
Figure 10:
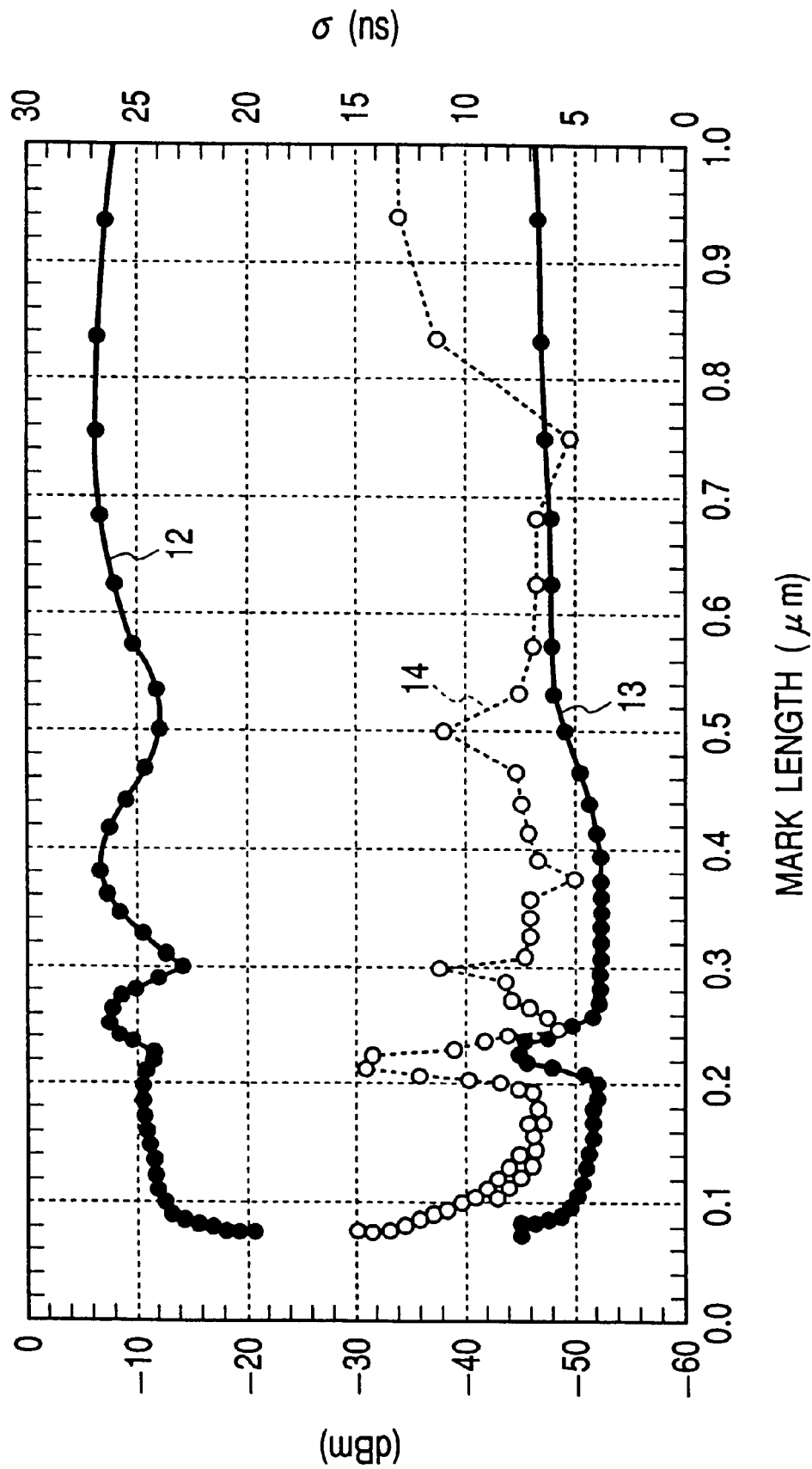
FIG. 10 diagrammatically illustrates the measurement results in a case where carrier, noise and jitter versus mark length were measured by means of the apparatus shown in FIG. 9.

The present inventor conducted an experiment using the apparatus shown in FIG. 9, in which a magnetic domain is recorded on the magneto-optical disk 1 with the length of the magnetic domain varied to perform domain wall displacement-reproduction by one beam as to the magnetic domains of varied lengths. Specifically, a fixed length of a magnetic domain is recorded repeatedly on the magneto-optical disk 1 with the length of the magnetic domain varied by magnetic field modulation-recording. The magnetic domains are reproduced by the domain wall displacement-reproduction system by one beam as illustrated in FIGS. 6A and 6B. Upon this reproduction, amounts of carrier, noise and jitter of a differentially detected signal were measured. FIG. 10 diagrammatically illustrates the measurement results thereof. Reference numerals 12, 13 and 14 indicate a characteristic curve for the carrier, a characteristic curve for the noise and a characteristic curve for the jitter, respectively.

The experiment was conducted under the following conditions. Namely, the wavelength of the semiconductor laser, which is a light source for the optical head 5, was 680 nm, the numerical aperture (NA) of the objective lens was 0.55, the measuring position on the magneto-optical disk 1 was 32 mm in a radial direction, and a linear velocity at this position was 1.5 m/s. Incidentally, the spot size of the optical head 5 was 1.1 µm in diameter at a position in which the intensity of light was $1/e^2$. The power of the semiconductor laser upon reproduction is preset within a range in which the temperatures on the magnetic layers do not exceed the Curie temperature of the displacement layer. Namely, two regions of a front region and a back region, in which a domain wall is displaced, are formed within the light spot for reproduction. As apparent from the results shown in FIG. 10, the waveform of the carrier greatly waves in magnetic domains the length of which is above 0.2 µm. The value of the jitter also varies according to this waviness. This comes from periodical mixing of signals from the front region and the back region as illustrated in FIGS. 7A to 7G. It is also understood that the waviness of the waveform of the carrier found in the magnetic domains the length of which is above 0.2 µm disappears in magnetic domains the length of which ranges from 0.1 to 0.2 µm, and the value of the jitter is also small. This cause will be described with reference to FIGS. 6A and 6B again.

In FIGS. 6A and 6B, the region of the high-temperature portion 60 is heated to a temperature above the Curie temperature of the switching layer 35 as described above. Therefore, the exchange-coupling between the memory layer 34 and the displacement layer 36 is broken, so that the pattern of the magnetic domain recorded on the memory layer 34 is not transferred to the displacement layer 36, and a domain wall of the displacement layer 36 on the high-temperature portion 60 tends to be displaced toward the high-temperature portion. First, with respect to the front region 61, the pattern of the magnetic domain recorded on the memory layer 34 comes in the front region 61 in a state that it has already been transferred to the displacement layer 36, since the medium rotates on its axis in a direction of an arrow A. At this time, the moving direction of the domain wall 58 and the moving direction of the high-temperature portion 60 become opposite to each other with the movement of the medium, and the domain wall 58 enters a region (high-temperature region) in which the domain wall of the displacement layer is easier to be displaced. Thereby, the displacement of the domain wall is always surely performed.

In the back region 62 on the other hand, the pattern of a magnetic domain recorded on the memory layer 34 is transferred to the displacement layer 36 after passing through the boundary of the high-temperature portion. At this time, the moving direction of the domain wall 59 and the moving direction of the high-temperature portion 60 likewise become opposite to each other with the movement of the medium. However, the domain wall 59 goes away from a region (high-temperature region) in which the domain wall of the displacement layer may be displaced. When the size of the magnetic domain is fully great, an upward or downward magnetic domain is surely transferred to the back region 62 of the high-temperature portion. A domain wall formed at the boundary of the high-temperature portion 60 at this time is displaced on the back region 62. In order to realize this transfer, however, it is necessary that an interfacial domain wall is accumulated over a certain region.

Specifically, it is necessary that the interfacial domain wall energy accumulated becomes greater than energy necessary for nucleation to the displacement layer. Accordingly, when the length of the magnetic domain becomes shorter than a certain length, the next magnetic domain of reversed magnetization comes before sufficient transfer takes place. Therefore, such a small magnetic domain as described above is transferred to the displacement layer at a position somewhat distant from the boundary of the back region. At that position, exchange-coupling force with the memory layer is exerted, so that no displacement of the domain wall occurs, and no change in the magnetization orientation of the back region 62 is caused. Namely, mixing of the signal leaked out of the back region 62 can be prevented.

In the results shown in FIG. 10, this preventing effect arises in 0.2 µm or shorter. Means for making this critical value greater include to increase the linear velocity, to improve the composition of the medium, to apply a one-direction magnetic field upon the reproduction, and so on. When the length of the magnetic domain is 0.1 µm or shorter, the values of carrier, noise and jitter are suddenly deteriorated. The reason for it is that a stable magnetic domain of 0.1 µm or shorter is not recorded on the memory layer 34. It is apparent that recording of 0.1 µm or shorter becomes feasible by improvements in the composition of the medium and the recording system.

As apparent from the above results, the domain wall displacement-reproduction becomes feasible in this medium by using the modulation system in which the minimum and maximum lengths of magnetic domains recorded on the memory layer 34 are about 0.1 µm and about 0.2 µm, respectively. In this case, since no Curie temperature mask of the displacement layer 36 is used, a proportion of the front region to the light spot also becomes greater, and a signal to noise ratio becomes better as well. For example, as an example of recording based on the length of magnetic domain (mark), it is considered to use MFM modulation. In the MFM modulation, both upward magnetization and downward magnetization are processed as magnetic domains, and information is converted into a combination of 3 magnetic domain lengths of 1T, 1.5T and 2T to record it. In order to conduct recording by the MFM modulation, recording by linear velocity-fixing system is conducted as 1T=0.1 μm, 1.5T=0.15 μm and 2T=0.2 μm in the recording based on the length of magnetic domain, whereby the above-described conditions are satisfied, and the domain wall displacement-reproduction becomes feasible.

As an example of recording based on the interval between magnetic domains, it is considered to use (1, 7) modulation. In this case, one of upward magnetization and downward magnetization is selected as a magnetic domain, and the size of a magnetic domain recorded is selected within a range of from 0.1 to 0.2 μm. For example, the size of the magnetic domain is determined to be 0.15 μm. In the (1, 7) modulation, a magnetic domain is recorded at an interval of from 2T to 8T. At this time, the shortest interval between magnetic domains is preset to at least twice the size of the magnetic domain. For example, when the shortest interval 2T between magnetic domains is supposed to be 0.3 μm for the size of the magnetic domain of 0.15 μm, 3T to 8T amount to 3T=0.45 μm, 4T=0.6 μm, 5T=0.75 μm, 6T=0.9 μm, 7T=1.05 μm and 8T=1.2 μm. Therefore, the above-described conditions are satisfied, and the domain wall displacement-reproduction becomes feasible.

Figure 11:
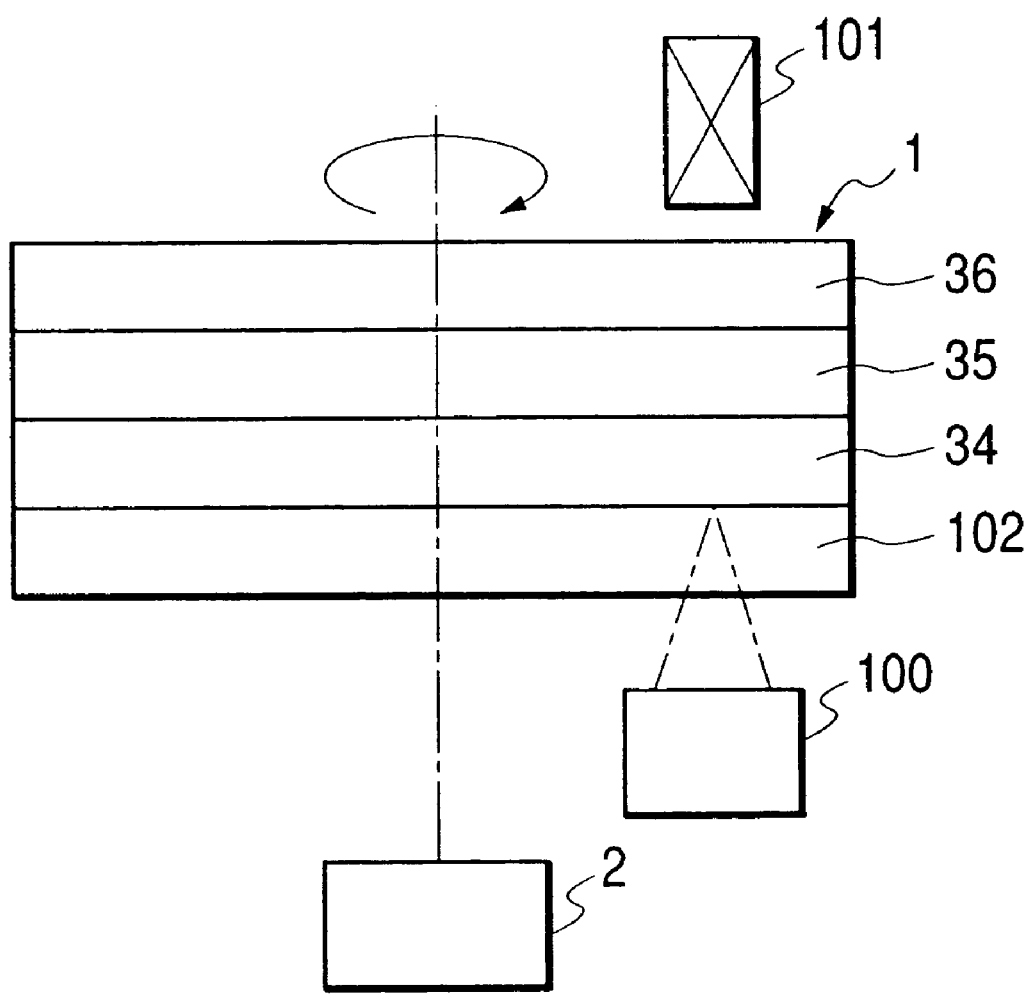
FIG. 11 illustrates the constitution of an information recording-reproducing apparatus used in an information recording-reproducing method according to a second embodiment of the present invention.

The second embodiment of the present invention will hereinafter be described. FIG. 11 illustrates the constitution of a magneto-optical recording-reproducing apparatus used in the second embodiment. In FIG. 9, reference numeral 1 designates a magneto-optical disk as a magneto-optical medium, which rotates on its axis at a predetermined rate according to drive of a spindle motor 2. Under the bottom surface of the magneto-optical disk 1, is arranged an optical pickup 100 composed of optical devices such as a semiconductor laser as a light source, a lens for focusing a laser beam into a small light spot to irradiate the disk 1, a photosensor for detecting reflected light from the disk 1, and the like. In addition, a recording magnetic field-applying device 101 for applying a magnetic field to the disk 1 is arranged at a position opposite to the optical pickup 100 with interposition of the magneto-optical disk 1.

As with the disk used in the first embodiment, the magneto-optical disk 1 is constructed by successively laminating of a first magnetic layer 34, a second magnetic layer 35 and a third magnetic layer 36 on a transparent substrate 102. As the substrate, there may be used a transparent material, for example, polycarbonate or glass. The individual magnetic layers are formed on the substrate by, for example, continuous sputtering by a magnetron sputtering system, or continuous vapor deposition.

These magnetic layers are exchange-coupled to one other by continuously forming the films under vacuum. In order to protect the magnetic layers from oxidation or to adjust their optical and thermal properties, a protective layer, light-interfering layer, heat-adjusting layer and/or the like formed of a dielectric or the like may be provided between the substrate 102 and the first magnetic layer 34, or on the third magnetic layer 36. In addition, a metal layer formed of Al, AlTa, AlTi, AlCr, Cu, Au or the like may be added into this layer structure to control thermal properties, or a protective coating composed of a resin may be applied. Alternatively, substrates, on which the respective layers have been formed, may be stuck to each other.

It is considered that the magnetic layers 34 to 36 are constructed with various magnetic materials as described above. For example, they may be formed by rare earth-iron group amorphous alloys composed of 10 to 40 atom % of at least one of rare earth elements such as Pr, Nd, Sm, Gd, Tb, Dy and Ho, and 90 to 60 atom % of at least one of elements of the iron group such as Fe, Co and Ni. In order to improve corrosion resistance and the like, elements such as Cr, Mn, Cu, Ti, Al, Si, Pt and/or In may be added in a small amount.

In the case of heavy rare earth-iron group amorphous alloys, saturation magnetization can be controlled by a compositional ratio of the rare earth elements to the elements of the iron group. The Curie temperature may also be controlled by the compositional ratio. However, in order to control the Curie temperature independently of the saturation magnetization, a method of using, as the element of the iron group, a material obtained by replacing a part of Fe by Co to control the amount replaced can be preferably utilized. More specifically, since rise in the Curie temperature of about 6° C. can be expected by replacing 1 atom % of Fe by Co, the amount of Co added is adjusted using this relation so as to give the desired Curie temperature. To the contrary, it is possible to lower the Curie temperature by adding a small amount of a non-magnetic element such as Cr or Ti. The Curie temperature may also be controlled by using at least two rare earth elements to adjust the compositional ratio. Besides the above materials, materials such as garnet, platinum group-iron group periodic structure films and platinum group-iron group alloys may be used.

For the first magnetic layer 34, it is desirable to use a rare earth-iron group amorphous alloy such as GdCo, GdFeCo, GdFe or NdGdFeCo, which has small vertical magnetization anisotropy, a platinum group-iron group periodic structure film such as Pt/Co or Pd/Co, or a material for bubble memory, such as garnet. For the second magnetic layer 35, it is desirable to use a material having a low Curie temperature, for example, TbFe, DyFe, TbDyFe, TbFeCo, DyFeCo or TbDyFeCo.

For the third magnetic layer 36, it is desirable to use a material having great vertical magnetization anisotropy and coercive force and being capable of recording minute bits and stably holding record bits formed, for example, a rare earth-iron group amorphous alloy such as TbFeCo, DyFeCo or TbDyFeCo. Incidentally, although a better reproduction signal can be obtained by using a magneto-optical medium of the structure having the second magnetic layer 35 as described above, the second magnetic layer 35 is not always necessary so far as a magnetic film having sufficiently small domain wall coercive force and great domain wall displaceability is used as the first magnetic layer 34.

When a signal is recorded on the magneto-optical disk 1, the recording on the disk 1 is conducted by modulating an external magnetic field while irradiating the disk 1 with a laser beam of such power that the third magnetic layer 36 is heated to a temperature above the Curie temperature from the optical pickup 100 in a state that the magneto-optical disk 1 is being rotated on its axis, or modulating the power of the laser beam while applying a magnetic field of a fixed direction. In the case of the latter, when the intensity of the laser beam is adjusted in such a manner that only a predetermined region within a light spot comes near to the Curie temperature of the third magnetic layer 36, a record magnetic domain smaller than the size of the light spot can be formed, so that a signal of frequency of less than optical diffraction limit can be recorded.

Figure 12A:
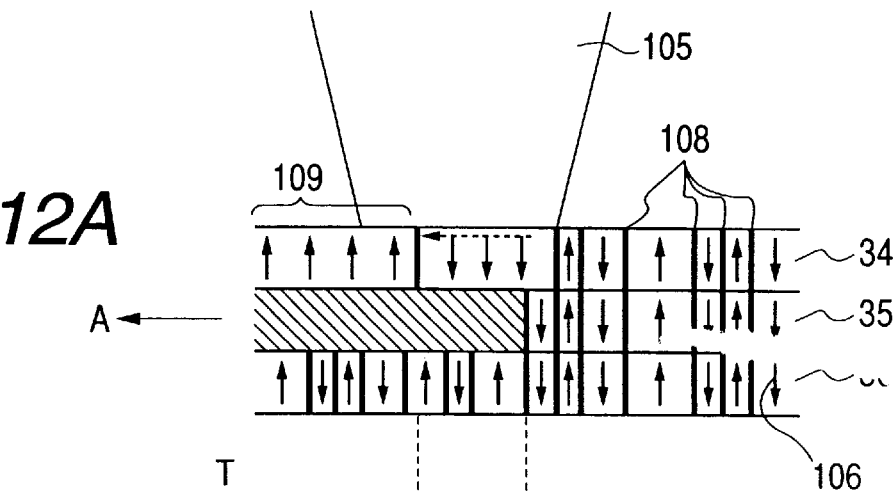
FIGS. 12A, 12B, 12C and 12D illustrate domain wall displacement-reproduction in the apparatus illustrated in FIG. 11.

The principle of information reproduction according to this embodiment will hereinafter be described. Domain wall displacement-reproduction by one beam will be described again though also described in Background Art. FIG. 12A illustrates conditions of the respective magnetic layers of the magneto-optical disk 1 upon reproduction. Reference numeral 105 indicates a light spot for reproduction projected from the optical pickup 100. Arrows 106 in the respective magnetic layers indicate directions of atomic spins, and domain walls 108 are formed at boundaries between regions in which the directions of spins are opposite to each other. The first to third magnetic layer 34 to 36 on the substrate 102 are exchange-coupled to one other at room temperature. The first magnetic layer 34 is composed of a magnetic film relatively smaller in domain wall coercive force and greater in domain wall displaceability at a temperature close to ambient temperature compared with the third magnetic layer 36. The second magnetic layer 35 is composed of a magnetic film having a Curie temperature lower than the first and third magnetic layers 34 and 36. FIG. 12D illustrates a record signal recorded on the disk 1.

Figure 12B:
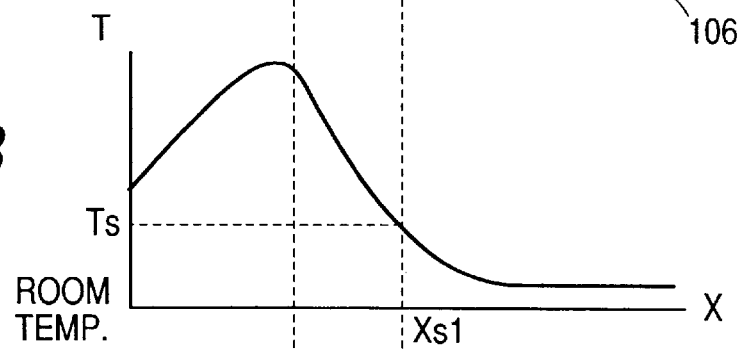
Figure 12C:
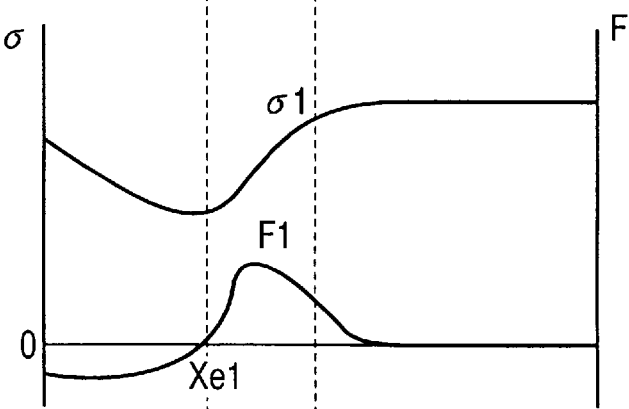
Figure 12D:
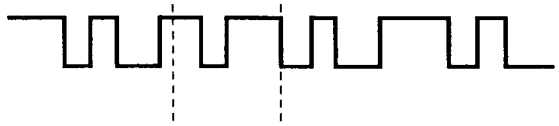

FIG. 12B diagrammatically illustrates a temperature distribution formed on the magneto-optical disk 1. The temperature distribution is induced on the medium by the light spot 105 for reproduction. At a position Xs1, the temperature of the medium is raised to Ts close to the Curie temperature of the second magnetic layer 35, at which the exchange-coupling between the first magnetic layer 34 and the third magnetic layer 36 is broken. FIG. 12C diagrammatically illustrates the distribution of domain wall energy density σ1 of the first magnetic layer corresponding to the temperature distribution in FIG. 12B. When a gradient of the domain wall energy density σ1 exists in a direction of x as described above, force F1 determined by the following equation acts on the domain walls 108 of the respective magnetic layers existing at a position x so as to displace the domain walls to a position at which the domain wall energy is lower.

$$F1 = \partial \sigma 1 / \partial x$$

On the other hand, force Fs also acts on the domain walls so as not to displace the domain walls. The force Fs is given by the following equation $$Fs = 2\pi \times Ms1 \times Hw1$$

wherein Ms1 is the saturation magnetization of the first magnetic layer 34, and Hw1 is the domain wall coercive force of the first magnetic layer 34. If this Fs is sufficiently small when the temperature of the medium is above Ts, the domain wall is easily displaced by the force F1. On the other hand, in a region on this side of Xs1 (right-hand side in FIG. 12A), the temperature of the medium is lower than Ts, and the first magnetic domain 34 is exchange-coupled with the third magnetic layer 36 great in domain wall coercive force, so that the domain wall in the first magnetic layer 34 is also fixed at a position corresponding to the position of the domain wall in the third magnetic layer 36 and is scarcely displaced.

When the domain wall 108 is at a position Xs1 of the medium as illustrated in FIG. 12B, and the temperature of the medium is raised to a temperature Ts close to the Curie temperature of the second magnetic layer 35, and so the exchange-coupling between the first magnetic layer 34 and the third magnetic layer 36 is broken, the domain wall 108 in the first magnetic layer 34 is displaced at high speed to a region Xe1 in which the temperature is higher and the domain wall energy density is lower, as indicated by a broken arrow. The displacement of the domain wall occurs every time the domain wall 108 comes to the position Xs1 with the movement of the medium. By detecting this displacement of the domain wall, a signal recorded at high density can be reproduced irrespective of the optical diffraction limit.

On the other hand, it is desirable from the viewpoint of signal reproduction that in a region 109 on the back side (right-hand side in FIG. 12A) of the position Xe1, no domain wall displacement should occur, and the magnetization of the first magnetic layer 34 be stable in a fixed direction. However, in the conventional methods, the displacement of a domain wall from the back side of the position Xe1 toward the position Xe1 has occurred as described above, so that a reproduction signal may have been deteriorated in some cases. The present inventor has paid attention to this respect and carried out an extensive investigation. As a result, it has been found that when the length of a record mark is shorter than a certain length, the displacement of a domain wall from the back side of the position Xe1 is prevented.

The length of the record mark in which the phenomenon that the displacement of a domain wall from the back side is prevented appears is about 0.2 μm like the first embodiment. When the length of the record mark became below 0.15 μm, the displacement of a domain wall from the back side is scarcely observed. Therefore, when recording of information is conducted by such a modulation system that the maximum record mark length after modulation of record information is at most 0.2 μm, the reproduction of the information by one beam becomes feasible at high density without need for any auxiliary heating means. It has also been found that when recording of information is conducted by such a modulation system that the maximum record mark length is at most 0.15 μm, the reproduction of the information is more stably feasible.

In order to stably conduct recording of information on the third magnetic layer 36 and transfer of a magnetic domain from the third magnetic layer 36 to the first magnetic domain 34 at room temperature, it is desirable that the length of a record mark be longer. It is thus desirable that the information be recorded by such a modulation system that the maximum record mark length is at most twice the minimum record mark length. As representatives of such a modulation system, FM modulation, MFM modulation and IDM modulation are known.

Figure 13:
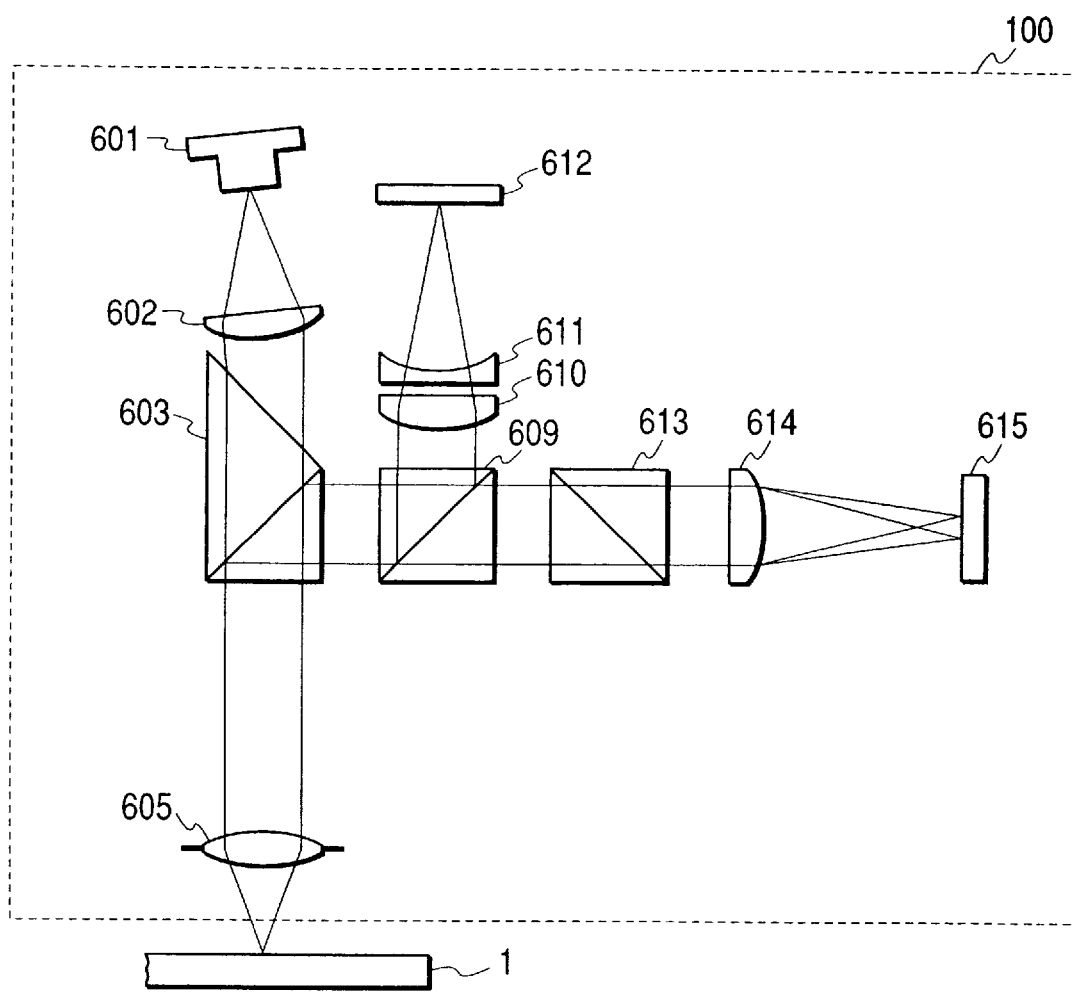
FIG. 13 illustrates an optical pickup of the apparatus shown in FIG. 11.

The constitution of the optical pickup 100 illustrated in FIG. 11 will hereinafter be described with reference to FIG. 13. In FIG. 13, an optical pickup of one beam system is used in this embodiment. Reference numeral 601 indicates a source of a laser beam for record reproduction, the wavelength of which is 680 nm. The laser beam source 601 is arranged in such a manner that P polarized light is incident on a magneto-optical disk 1. Reference numeral 603 indicates a beam splitter equipped with a beam-shaping part, which is designed to transmit 70 to 80% of P polarized light and completely reflect S polarized light. Reference numeral 605 designates an objective lens designed according to the wavelength of the laser beam for record reproduction. The NA thereof is 0.55. Incidentally, reference numeral 602 is a collimator lens, 610 and 614 convex lenses, and 611 a cylindrical lens.

The objective lens 605 is controlled by a serve actuator and a servo circuit (both, not illustrated) to conduct tracking control and focusing control in such a manner that a light spot for record reproduction scans in focus on an information track of the magneto-optical disk 1. Reference numeral 609 indicates a beam splitter for distributing reflected light from the magneto-optical disk 1 to an RF sensor 615 for detecting an information signal and a servo sensor 612 for detecting a track error signal and a focus error signal. Reference numeral 613 indicates a birefringence crystal for separating polarized light components of ±45° to the incident light to differentially detect the reflected light from the magneto-optical disk 1. In the case where information is recorded, a magnetic levitation head is used as the recording magnetic field-applying device 101 to conduct recording by a magnetic field modulation-recording system. The spot size of the optical pickup 100 was 1.1 μm in diameter at a position in which the intensity of light was $1/e^2$.

The present inventor carried out an experiment on domain wall displacement-reproduction for finding conditions under which the displacement of a domain wall from the back side is prevented. First of all, a recording medium used in the experiment was prepared in the following manner. After a direct-current magnetron sputtering system was equipped with respective targets of B-doped Si, and Gd, Dy, Tb, Fe and Co, and a polycarbonate substrate, in which guide grooves for tracking had been formed, was fixed to a substrate holder, a chamber is evacuated with a cryopump to a high vacuum of $1\times10^{-5}$ Pa or lower. While evacuating the chamber, Ar gas and $N_2$ gas were introduced to 0.3 Pa into the chamber, thereby forming an SiN layer of 1000 Å as a light transmitting layer while rotating the substrate on its axis.

While evacuating the chamber, Ar gas was then introduced to 0.3 Pa into the chamber, thereby successively forming a GdCo layer of 300 Å as a first magnetic layer, a DyFe layer of 100 Å as a second magnetic layer and a TbFeCo layer of 400 Å as a third magnetic layer while rotating the substrate on its axis. Lastly, an SiN layer of 800 Å as a protective layer was formed under the same conditions as those used in the formation of the light transmitting layer. A mixing ratio of the Ar gas to the $N_2$ gas was adjusted in such a manner that the refractive indices of the SiN layers were each 2.3. The respective magnetic layers were formed by applying direct current power to their corresponding targets of Gd, Dy, Tb, Fe and Co. The composition of each magnetic layer was adjusted so as to give a near compensation composition. The Curie temperatures of the first, second and third magnetic layers were preset to at least 250° C., about 160° C. and about 290° C., respectively.

Figure 14:
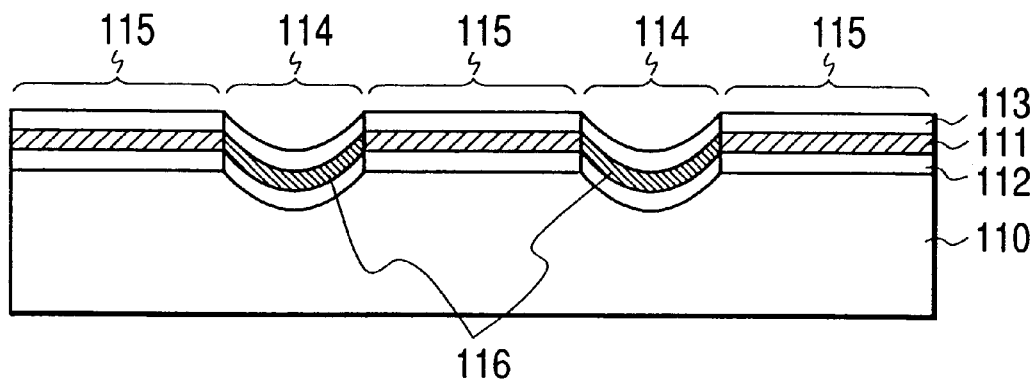
FIG. 14 is a cross-sectional view of a recording medium used in the second embodiment of the present invention.

In addition, a laser beam of high power was projected in focus on grooves of the recording medium thus prepared to heat the groove portions to at least 500° C., thereby annealing only the groove portions. FIG. 14 shows a recording medium subjected to the annealing treatment. In FIG. 14, reference numeral 110 indicates a substrate, and 111 a magnetic layer including first to third magnetic layers. Besides the above, the recording medium illustrated in FIG. 14 is provided with a light transmitting layer 112 and a protective layer 113. Portions of the laminated magnetic layer 111 corresponding to the groove portions 114 are modified into non-magnetic layer portions 116 by the annealing treatment. Therefore, portions of the laminated magnetic layer 111 corresponding to land portions 115 are magnetically separated from one another by the groove portions 114.

Figure 15:
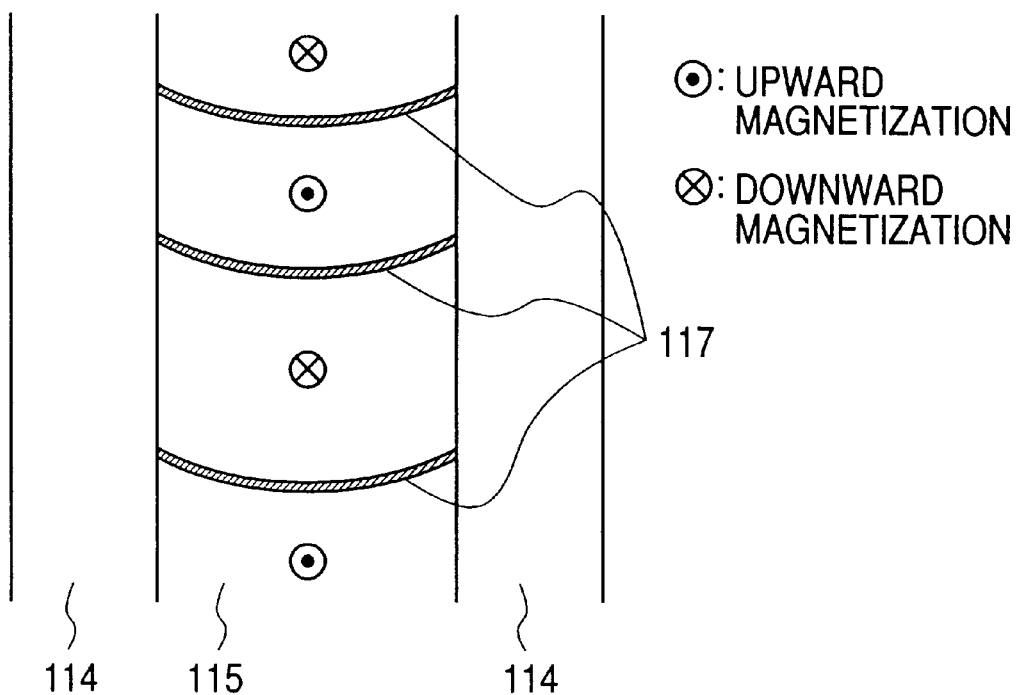
FIG. 15 is a plan view of the recording medium of FIG. 14.

Even if the magnetic layer portions corresponding to groove portions are not completely modified into non-magnetic layer portions, coupling at the groove portions can be indeed ignored so far as saturation magnetization becomes sufficiently small there. In this embodiment, the mutual magnetic separation between information tracks includes such a state. When inverse magnetic domains are formed over the full width of the land portion 115, open domain walls 117 are formed at boundaries between magnetic domains on the land portion 115 as illustrated in FIG. 15. Such a domain wall 117 can be easily displaced because its displacement in a direction of the track is accompanied by neither formation nor extinction of a domain wall at the sides of the track.

Figure 16A:
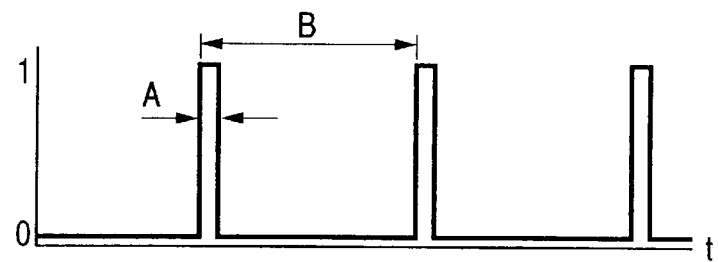
FIGS. 16A, 16B, 16C and 16D illustrate a record signal, modulated magnetic field and waveforms of reproduced signals in the case where an experiment was conducted according to the second embodiment of the present invention.
Figure 16B:
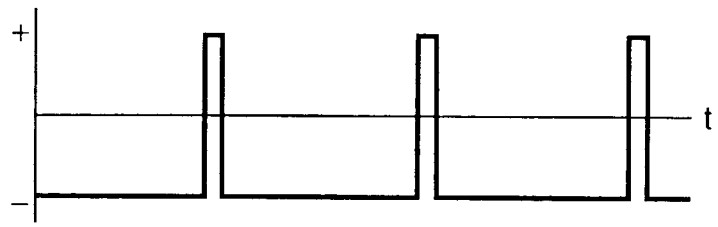

Twenty recording media were prepared in such a manner to conduct the following recording-reproducing experiments on the recording media. Each of the recording media thus prepared was rotated on its axis in such a manner that its velocity relative to a light beam for record reproduction was 2 m/s, to apply such a magnetic field as illustrated in FIG. 16B to the medium while irradiating the medium with a DC laser light beam of 7 mW for record reproduction, thereby recording such a signal as illustrated in FIG. 16A on the medium. A ratio A:B of a length A of a record mark to an interval B between record marks was preset to 1:10, and a signal was recorded with the length A of the record mark varied from 0.1 μm to 0.15 μm, 0.2 μm, 0.25 μm, 0.3 μm, 0.35 μm or 0.4 μm. The intensity of the magnetic field was preset to ±200 (Oe).

Figure 16C:
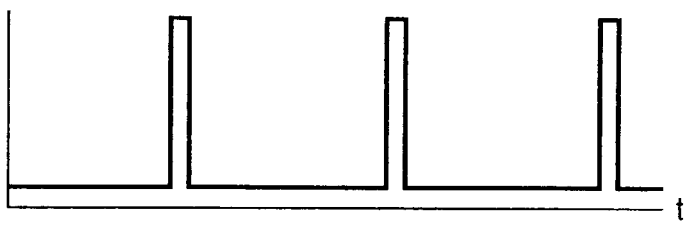
Figure 16D:
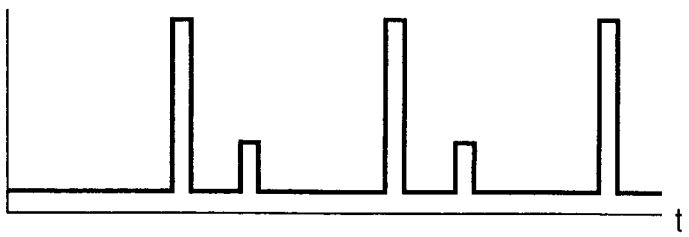

The record marks thus recorded were reproduced with the power of a light beam for reproduction preset to 2.0 mW, and a reproduced signal was observed through an oscilloscope. If no displacement of a domain wall from the back side of the light beam for reproduction occurs at this time, one reproduction waveform caused by the displacement of a domain wall from the front side of the light spot for reproduction can be observed as illustrated in FIG. 16C. If displacement of a domain wall from the back side of the light beam for reproduction occurs on the other hand, two reproduction waveforms caused by the displacement of domain walls from the back and front sides of the light spot for reproduction can be observed as illustrated in FIG. 16D.

Figure 17:
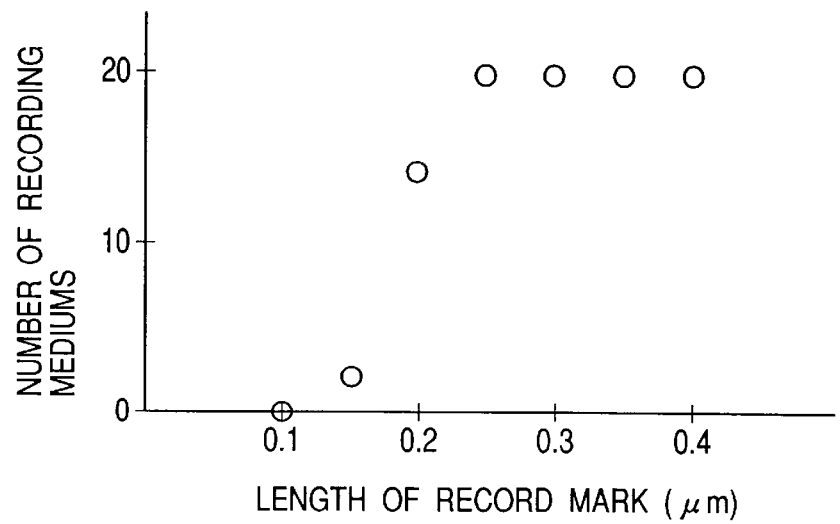
FIG. 17 diagrammatically illustrates the number of recording media, on which displacement of a domain wall from the back side of a light spot for reproduction has been observed, versus the length of a record mark in the case where an experiment was conducted according to the second embodiment of the present invention.

FIG. 17 diagrammatically illustrates the results of the reproducing experiment on the 20 recording media. An axis of abscissa indicates the length of a record mark, and an axis of ordinate the number of recording media on which domain wall displacement from the back side of the light beam for reproduction has been observed. As apparent from the experimental results shown in FIG. 17, it is understood that displacement of a domain wall from the back side of the light beam for reproduction always occurs when the length of the record mark is 0.25 μm or longer, while 4 media of 20 media undergo no displacement of a domain wall from the back side of the light beam for reproduction when the length of the record mark is made 0.2 μm or shorter. It is also understood that when the length of the record mark is made 0.15 μm or shorter, the information can be reproduced in almost all the recording media without being accompanied by displacement of a domain wall from the back side of the light beam for reproduction.

Figure 18A:
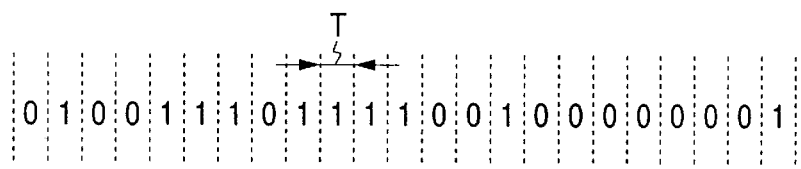
FIGS. 18A, 18B, 18C and 18D illustrate record data, MFM modulated record signal, recording magnetic field and pattern of record magnetization in the case where information was recorded by MFM modulation by means of the apparatus shown in FIG. 11 to jitter.
Figure 18B:
Figure 18C:
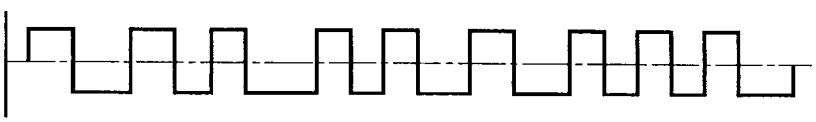
Figure 18D:

Recording media, on which displacement of a domain wall from the back side of the light beam for reproduction had not been observed in a record mark length of 0.2 μm, were selected from among the 20 recording media used in the above experiment to conduct the following experiment thereon. Using the apparatus illustrated in FIG. 11, an MFM-modulated random signal a part of which is illustrated in FIG. 18B was first recorded on each of the recording media by a magnetic field modulation-recording system. The signal illustrated in FIG. 18B is that obtained by MFM-modulating data illustrated in FIG. 18A. A recording magnetic field for recording this signal is illustrated in FIG. 18C. When recording is conducted, the recording medium was rotated on its axis in such a manner that its velocity relative to a light beam for record reproduction was 2 m/s, to apply such a magnetic field as illustrated in FIG. 18C to the medium while irradiating the medium with a DC laser light beam of 7 mW for record reproduction, thereby recording a signal, a part of which is illustrated in FIG. 18B, on the medium. The intensity of the magnetic field was preset to ±200 Oe, and an interval T between data bits of a record signal was preset to 50 ns. The lengths of marks recorded on the medium at this time are three lengths of 0.1 μm, 0.15 μm and 0.2 μm.

The signal thus recorded was reproduced with the power of a light beam for reproduction preset to 2.0 mW, and a time interval of a pulse width of a reproduced signal was measured, thereby measuring a jitter. As a result, the jitter was found to be 6.7 ns for the mark of 0.1 μm, 6.8 ns for the mark of 0.15 μm or 6.8 ns for the mark of 0.2 μm. In each case, a good value was obtained. From this measurement result, it was able to be confirmed that the media, on which no displacement of a domain wall from the back side occurred in the experiment shown in FIG. 17, are also small in jitter of the reproduced signal, and so reproduction is successfully conducted. In particular, since the MFM modulation is characterized in that a ratio of the longest record mark to the shortest record mark is small, it may be preferably used when the maximum length of the record mark is 0.2 μm or shorter.

For the sake of comparison with the above-described measurement of jitter, an MFM-modulated random signal was recorded on the recording medium under the same conditions as described above except that the interval between data bits was changed to 75 nm. The lengths of marks recorded on the medium at this time are three lengths of 0.15 μm, 0.225 μm and 0.3 μm. This signal was reproduced with the power of a light beam for reproduction preset to 2.0 mW, and a time interval of a pulse width of a reproduced signal was measured, thereby measuring a jitter. As a result, the jitter was found to be 18 ns for the mark of 0.15 μm, 16 ns for the mark of 0.225 μm or 13 ns for the mark of 0.3 μm. The jitter was greatly deteriorated compared with the above result. Namely, since the maximum length of the record mark in this experiment was 0.3 μm, the jitter was greatly deteriorated.

Further, recording media, on which displacement of a domain wall from the back side of the light beam for reproduction had not been observed, were selected from among the 20 recording media to conduct the following experiment thereon. Using the apparatus illustrated in FIG. 3, such an MFM-modulated random signal as illustrated in FIG. 18B was first recorded on each of the recording media by a magnetic field modulation-recording system. At this time, the relative velocity of the recording medium to a light beam for record reproduction was preset to 1.5 m/s to apply such a magnetic field as illustrated in FIG. 18C to the medium while irradiating the medium with a DC laser light beam of 5.5 mW for record reproduction, thereby recording a signal, a part of which is illustrated in FIG. 18B, on the medium. The intensity of the magnetic field was preset to ±200 Oe, and an interval T between data bits of a record signal was preset to 67 ns. At this time, the lengths of marks recorded on the medium are three lengths of 0.1 μm, 0.15 μm and 0.2 μm.

The signal thus recorded was reproduced with the power of a light beam for reproduction preset to 1.7 mW, and a time interval of a pulse width of a reproduced signal was measured, thereby measuring a jitter. As a result, the jitter was found to be 8.5 ns for the mark of 0.1 μm, 8.6 ns for the mark of 0.15 μm or 8.4 ns for the mark of 0.2 μm. In each case, a good value was obtained.

For the sake of comparison with the above result, an experiment in which a random signal (1, 7)-modulated in such a manner that the shortest mark length was 0.1 μm, and the longest mark length was 0.4 μm was recorded on a recording medium to measure a jitter was tried. The apparatus, media and measuring conditions used were the same as described above. At this time, the lengths of marks recorded on the medium are seven lengths of 0.1 μm, 0.15 μm, 0.2 μm, 0.25 μm, 0.3 μm, 0.35 μm and 0.4 μm. This signal was reproduced with the power of a light beam for reproduction preset to 1.7 mW, and a time interval of a pulse width of a reproduced signal was measured, thereby measuring a jitter. As a result, signals of the respective mark lengths were not separated from one another, and so the measurement of the jitter was unfeasible. This is due to the fact that the maximum length of the record mark was 0.4 μm.

Further, recording media, on which displacement of a domain wall from the back side of the light beam for reproduction had not been observed, were selected from among the 20 recording media to conduct the following experiment thereon. Using the apparatus illustrated in FIG. 11, RLL (2, 7) pit position-coded random signal was first recorded on each of the recording media by a magnetic field modulation-recording system. The relative velocity of the recording medium to a light beam for record reproduction was preset to 2 m/s to irradiate the medium with a DC laser light beam of 7 mW for record reproduction. The intensity of the magnetic field was preset to ±200 Oe, and an interval T between data bits of a record signal was preset to 100 ns to record record marks in a length of 0.75T. At this time, the length of marks recorded on the medium is 0.15 μm, and intervals between record marks are six lengths of 0.3 μm, 0.4 μm, 0.5 μm, 0.6 μm, 0.7 μm and 0.8 μm.

The signal thus recorded was reproduced with the power of a light beam for reproduction preset to 2 mW, and a time interval of a pulse interval of a reproduced signal was measured, thereby measuring a jitter. As a result, the jitter of each pulse interval was within a range of from 6.5 ns to 6.8 ns, and so a good value was obtained. Namely, since, in such recording based on pit position, recording is conducted with a mark interval varied in a fixed mark length, a method in which the length of a mark is preset to 0.2 μm or shorter can be easily used.

Finally, magneto-optical media were prepared under the following conditions to investigate a relationship between a spot size of an optical pickup and a maximum length of a record mark.

After a direct-current magnetron sputtering system was equipped with respective targets of B-doped Si, and Gd, Dy, Tb, Fe and Co, and a polycarbonate substrate, in which guide grooves for tracking had been formed, was fixed to a substrate holder, a chamber is evacuated with a cryopump to a high vacuum of $1 \times 10^{-5}$ Pa or lower. While evacuating the chamber, Ar gas and $N_2$ gas were introduced to 0.3 Pa into the chamber, thereby forming an SiN layer of 800 Å as a light interfering layer while rotating the substrate on its axis. While evacuating the chamber, Ar gas was then introduced to 0.3 Pa into the chamber, thereby successively forming a $Gd_{0.23}(Fe_{0.97}CO_{0.03})_{0.77}$ layer of 300 Å as a first magnetic layer, a $Dy_{0.20}(Fe_{0.95}CO_{0.05})_{0.80}$ layer of 100 Å as a second magnetic layer and a $Tb_{0.20}(Fe_{0.80}CO_{0.20})_{0.80}$ layer of 800 Å as a third magnetic layer while rotating the substrate on its axis. Lastly, an SiN layer of 800 Å as a protective layer was formed under the same conditions as those used in the formation of the light interfering layer. A mixing ratio of the Ar gas to the $N_2$ gas was adjusted in such a manner that the refractive indices of the SiN layers were each 2.3. The respective magnetic layers were formed by applying direct current power to their corresponding targets of Gd, Dy, Tb, Fe and Co. The composition of each magnetic layer was adjusted so as to give a near compensation composition. The Curie temperatures of the first, second and third magnetic layers were about 250° C., about 160° C. and about 290° C., respectively.

In addition, a laser beam of high power was projected in focus on grooves of the recording medium thus prepared to heat the groove portions to at least 500° C., thereby annealing only the groove portions. Portions of the laminated magnetic layer corresponding to the groove portions are modified into non-magnetic layer portions by the annealing treatment. Therefore, portions of the laminated magnetic layer corresponding to land portions are magnetically separated from one another by the groove portions. Even if the magnetic layer portions corresponding to groove portions are not completely modified into non-magnetic layer portions, coupling at the groove portions can be indeed ignored so far as saturation magnetization becomes sufficiently small there. In the present invention, the mutual magnetic separation between information tracks includes such a state.

Twenty recording media were prepared in such a manner to measure their recording-reproducing characteristics. An optical pickup of a recording-reproducing apparatus used in the measurement had the same constitution as that of the above-described apparatus except that the wavelength of a laser beam for record reproduction was 635 nm, and the NA of an objective lens was 0.60. The spot size of this optical pickup was 0.9 $\mu$m in diameter at a position in which the intensity of light was $1/e^2$.

The recording of information was conducted by a magnetic field modulation-recording system using a magnetic levitation head.

Each of the recording media was rotated on its axis in such a manner that its velocity relative to a light beam for record reproduction was 2 m/s to apply such a magnetic field as illustrated in FIG. 16B to the medium while irradiating the medium with a DC laser light beam of 5 mW for record reproduction, thereby recording a signal illustrated in FIG. 16A on the medium. A ratio A:B of a length A of a record mark to an interval B between record marks was preset to 1:10, and a signal was recorded with the length A of the record mark varied from 0.1 $\mu$m to 0.12 $\mu$m, 0.14 $\mu$m, 0.16 $\mu$m, 0.18 $\mu$m, 0.20 $\mu$m, 0.22 $\mu$m or 0.24 $\mu$m. The intensity of the magnetic field was preset to ±200 Oe.

Figure 19:
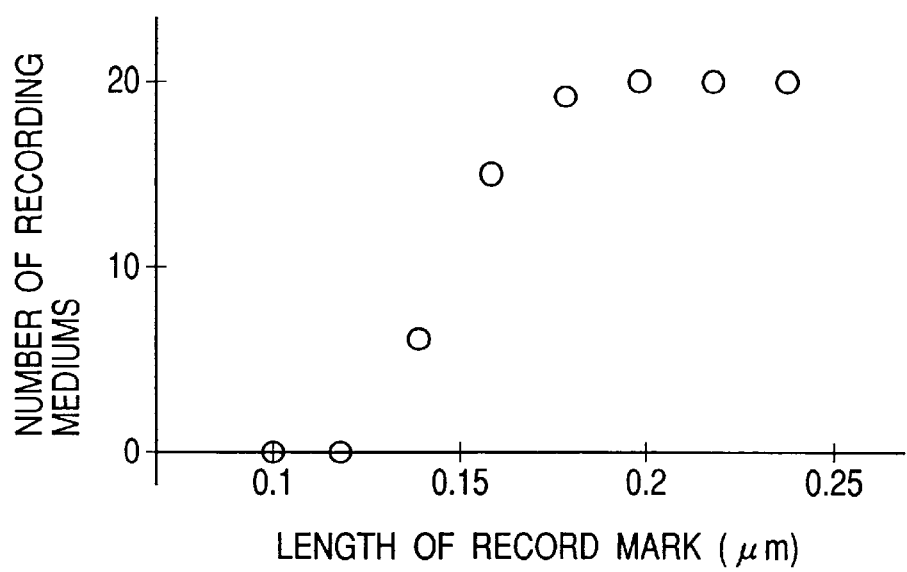
FIG. 19 diagrammatically illustrates the number of recording media, on which displacement of a domain wall from the back side of a light spot for reproduction has been observed, versus the length of a record mark.

This record mark was reproduced with the power of a light beam for reproduction preset to 1.7 mW, and a reproduced signal was observed through an oscilloscope. If no displacement of a domain wall from the back side of the light beam for reproduction occurs at this time, such a reproduction waveform as illustrated in FIG. 16C is observed. If displacement of a domain wall from the back side of the light beam for reproduction occurs on the other hand, such a reproduction waveform as illustrated in FIG. 16D is observed. The result of the reproducing experiment on the 20 recording media is shown in FIG. 19. In FIG. 19, an axis of abscissa indicates the length of a record mark, and an axis of ordinate the number of recording media on which domain wall displacement from the back side of the light beam for reproduction has been observed. As apparent from the result shown in FIG. 19, it is understood that displacement of a domain wall from the back side of the light beam for reproduction always occurs when the length of the record mark is 0.20 $\mu$m or longer, while 5 media of 20 media undergo no displacement of a domain wall from the back side of the light beam for reproduction when the length of the record mark is made 0.16 $\mu$m or shorter. It is also understood that when the length of the record mark is made 0.12 $\mu$m or shorter, the information can be reproduced in all the recording media without being accompanied by displacement of a domain wall from the back side of the light beam for reproduction.

Figure 20:
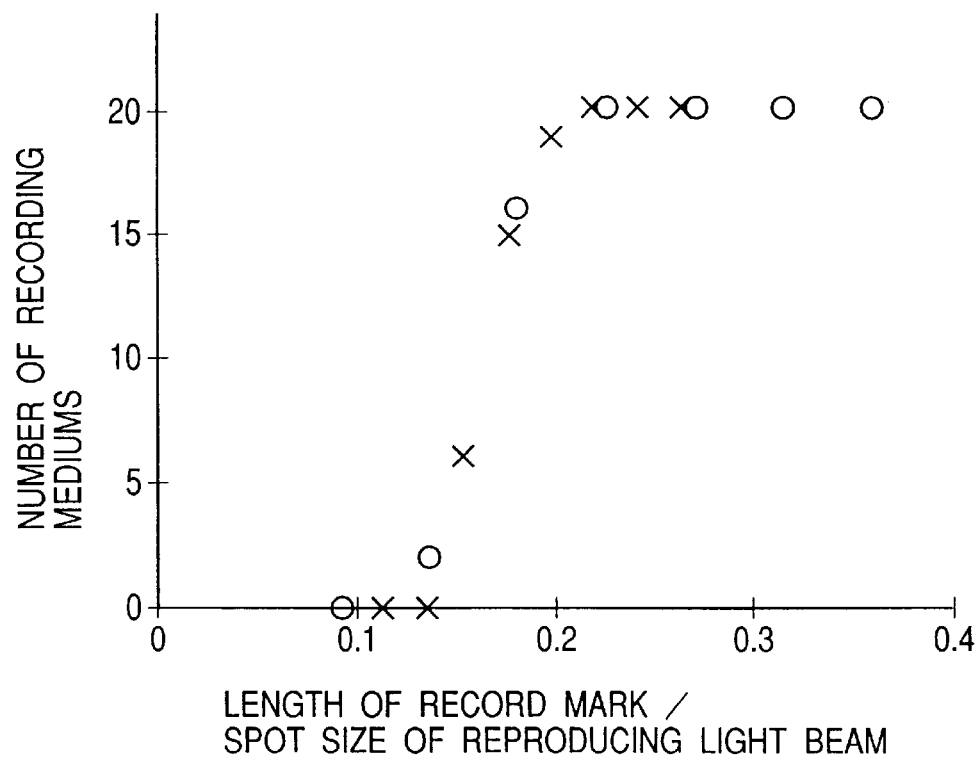
FIG. 20 diagrammatically illustrates the relationship between (record mark length/spot size) and the number of recording media on which displacement of a domain wall from the back side of a light spot for reproduction has been observed.

In FIG. 20, the above result, i.e., the experimental result in the case where the spot size of the light beam for reproduction was 0.9 $\mu$m, is plotted (record mark length/spot size of the light beam for reproduction) as an axis of abscissa and (the number of recording media on which domain wall displacement from the back side of the light beam for reproduction has been observed) as an axis of ordinate. In FIG. 20, the result of the experiment this time is indicated by marks of a cross x. In FIG. 20, the result of the preceding experiment, i.e., the experimental result in the case where the spot size of the light beam for reproduction was 1.1 $\mu$m, is also illustrated together by marks of a circle o. As apparent from FIG. 20, it is understood that when the length of a record mark is made at most 0.18 times the spot size of the light beam for reproduction, the information can be reproduced without being accompanied by displacement of a domain wall from the back side of the light beam for reproduction. It is also understood that when the length of a record mark is made at most 0.15 times the spot size of the light beam for reproduction, the information can be more stably reproduced without being accompanied by displacement of a domain wall from the back side of the light beam for reproduction.

The spot size of the light beam means a diameter of a light beam the intensity of which is $1/e^2$.

Recording media, on which displacement of a domain wall from the back side of the light beam for reproduction had not been observed in a record mark length of 0.16 $\mu$m, were selected from among the recording media prepared this time to conduct the following experiment thereon. A recording-reproducing apparatus used is the same apparatus as described above.

Using the recording-reproducing apparatus, an MFM-modulated random signal was first recorded on each of the magneto-optical media by a magnetic field modulation-recording system. The recording medium was rotated on its axis in such a manner that its velocity relative to a light beam for record reproduction was 1.5 m/s to record the signal on the medium while irradiating the medium with a DC laser light beam of 4 mW for record reproduction. The intensity of a magnetic field for recording was preset to ±200 Oe. An interval T between data bits of a record signal was preset to 53 ns. The lengths of marks recorded on the medium at this time are three lengths of 0.08 $\mu$m, 0.12 $\mu$m and 0.16 $\mu$m, which were 0.089 times, 0.133 times and 0.177 times the spot size of the light beam for reproduction, respectively.

The signal thus recorded was reproduced with the power of a light beam for reproduction preset to 1.5 mW, and a time interval of a pulse width of a reproduced signal was measured, thereby measuring a jitter. As a result, the jitter was found to be 7.4 ns for the mark of 0.08 $\mu$m, 7.2 ns for the mark of 0.12 $\mu$m or 7.2 ns for the mark of 0.16 $\mu$m. In each case, a good value was shown.

For the sake of comparison with the above result, an MFM-modulated random signal was recorded under the same conditions as those described above except that the interval between data bits of a record signal was changed to 80 nm. At this time, the lengths of marks recorded on the medium are three lengths of 0.12 $\mu$m, 0.18 $\mu$m and 0.24 $\mu$m. This signal was reproduced with the power of a light beam for reproduction preset to 1.5 mW, and a time interval of a pulse width of a reproduced signal was measured, thereby trying to measure a jitter. However, signals of the respective mark lengths were not separated from one another, so that the measurement of the jitter was unfeasible.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording-reproducing method, wherein a domain wall is displaced on a recording medium in which information has been recorded, thereby conducting the reproduction of the information, the method comprising:

projecting a light spot on the recording medium;

moving relatively the light spot and the recording medium;

applying a magnetic field modulated according to the information to a region on which the light spot has been projected to form a record mark the maximum mark length of which is at most 0.15 times a spot size of the light spot; and displacing the domain wall from a front to a back of a moving direction of the light spot by a temperature distribution formed on the recording medium by the light spot, and at the same time detecting the displacement of the domain wall by reflected light of the light spot, thereby detecting the record mark.

2. The method according to claim 1, wherein the maximum mark length is at most 0.2 $\mu$m.

3. The method according to claim 1, wherein the recording medium comprises a first magnetic layer the domain wall in which can be displaced, a third magnetic layer in which information is stored, and a second magnetic layer arranged between the first and third magnetic layers and having a Curie temperature lower than the first and third magnetic layers.

4. The method according to claim 1, wherein the maximum mark length is at most 0.15 $\mu$m.

5. The method according to claim 1, wherein the maximum mark length is at most twice the minimum mark length.

6. The method according to claim 1, wherein said spot size is determined by a diameter of said light spot, wherein an intensity of said light spot is $1/e^2$.

7. A magneto-optical medium capable of reproducing information by displacing a domain wall relatively to a light spot, wherein the information is formed by a record mark the maximum mark length of which is at most 0.15 times a spot size of the light spot.

8. The magneto-optical medium according to claim 7, wherein the maximum mark length is at most 0.2 $\mu$m.

9. The magneto-optical medium according to claim 7, wherein the maximum mark length is at most 0.15 $\mu$m.

10. The magneto-optical medium according to claim 7, wherein the maximum mark length is at most twice the minimum mark length.

11. The method according to claim 7, wherein said spot size is determined by a diameter of said light spot, wherein an intensity of said light spot is $1/e^2$.

* * * * *

UNITED STATES PATENT AND TRADEMARK OFFICE
CERTIFICATE OF CORRECTION

PATENT NO. : 6,249,489 B1
DATED : June 19, 2001
INVENTOR(S) : Eiichi Fujii et al.

It is certified that error appears in the above-identified patent and that said Letters Patent is hereby corrected as shown below:

<u>Title page, Item [54], and Column 1, line 4,</u>
Title: "MAGNETO OPTICAL" should read -- MAGNETO-OPTICAL --; and
Item [56], References Cited: insert :

-- OTHER PUBLICATIONS
Patent Abstracts of Japan, Publication No. 10092938 (JP-A 08-246,259) (April 10, 1998) --.

<u>Column 7,</u>
Line 62, "simplifies" should read -- simplify --.

<u>Column 10,</u>
Line 16, "conduct" should be deleted; and
Line 63, "an" should read -- a --.

<u>Column 12,</u>
Line 25, "fully great" should read -- fully grown --.

<u>Column 16,</u>
Line 60, "serve" should read -- servo --.

<u>Column 24,</u>
Line 30, "method" should read -- magneto-optical medium --.

Signed and Sealed this

Eighteenth Day of June, 2002

*Attest:*

JAMES E. ROGAN
*Attesting Officer*   *Director of the United States Patent and Trademark Office*